US011909921B1

(12) United States Patent
Paul

(10) Patent No.: US 11,909,921 B1
(45) Date of Patent: Feb. 20, 2024

(54) PERSISTENT DIGITAL VIDEO STREAMING

(71) Applicant: Meta Platforms, Inc., Menlo Park, CA (US)

(72) Inventor: Debashish Paul, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/128,743

(22) Filed: Dec. 21, 2020

(51) Int. Cl.
*H04M 3/56* (2006.01)
*H04L 65/403* (2022.01)
*H04N 7/14* (2006.01)
*H04N 7/15* (2006.01)
*H04L 65/401* (2022.01)

(52) U.S. Cl.
CPC .......... *H04M 3/563* (2013.01); *H04L 65/403* (2013.01); *H04L 65/4015* (2013.01); *H04M 3/567* (2013.01); *H04N 7/147* (2013.01); *H04N 7/152* (2013.01)

(58) Field of Classification Search
CPC ... H04M 3/563; H04M 3/567; H04L 65/4015; H04L 65/403; H04N 7/147; H04N 7/152
See application file for complete search history.

(56) References Cited

U.S. PATENT DOCUMENTS 9,462,017 B1 * 10/2016 Siracusano, Jr. ... H04L 65/4038
9,681,099 B1 * 6/2017 Deets, Jr. ................. H04L 51/32
9,686,497 B1 * 6/2017 Terry .................. H04L 65/4015

2004/0006595 A1 * 1/2004 Yeh ........................ H04L 12/18
 709/204
2006/0182249 A1 * 8/2006 Archambault ...... H04L 12/1818
 379/202.01
2014/0028789 A1 * 1/2014 Bentley .................. H04M 3/567
 348/14.12
2015/0358584 A1 * 12/2015 Mattson .............. G06F 3/04842
 348/14.08
2015/0365522 A1 * 12/2015 Anderson ........... H04L 65/1093
 379/188
2018/0335921 A1 * 11/2018 Karunamuni ......... G06F 3/0485
(Continued)

FOREIGN PATENT DOCUMENTS

WO WO 00/10099 A1 * 2/2000 ......... H04L 12/1813
WO WO-2018175989 A1 * 9/2018 ........... H04L 65/403
WO WO-2019217477 A1 * 11/2019 ............. H04L 51/04

OTHER PUBLICATIONS

Lefebvre, Rob, "Loomie Puts an Animated 3D Avatar Into YourZoom Calls", URL: https://www.lifewire.com/loomie-puts-animated-3d-avatar-into-your-zoom-calls-4843385, Apr. 28, 2020, pp. 1-9.
(Continued)

*Primary Examiner* — Patrice L Winder
(74) *Attorney, Agent, or Firm* — Greenberg Traurig, LLP

(57) ABSTRACT

Systems and methods for social media music streaming may include (1) creating a digital video room for a group of users that is configured to alternate between a lobby state and a live state and, in response to a triggering event, (2) toggling between (i) a lobby interface, corresponding to the lobby state, that enables asynchronous digital exchanges between the users of the group and (ii) a live interface, corresponding to the live state, that enables synchronous video conferencing between the users of the group. Various other methods, systems, and computer-readable media are also disclosed.

20 Claims, 18 Drawing Sheets

(56) References Cited

U.S. PATENT DOCUMENTS

2018/0335939 A1* 11/2018 Karunamuni ......... G06F 3/0484
2020/0044996 A1*  2/2020 Johnson ................ H04L 51/046
2020/0322648 A1* 10/2020 Kelly ................... H04N 21/235
2021/0352120 A1* 11/2021 Masi .................... H04L 65/4015
2022/0070232 A1*  3/2022 Young .................. H04L 65/611

OTHER PUBLICATIONS

Sawers, Paul, "MapChat: The location-based instant messaging app forstrangers", URL: https://thenextweb.com/apps/2011/08/25/mapchat-the-location-based-instant-messaging-app-for-strangers/, Aug. 25, 2011, pp. 1-6.

* cited by examiner

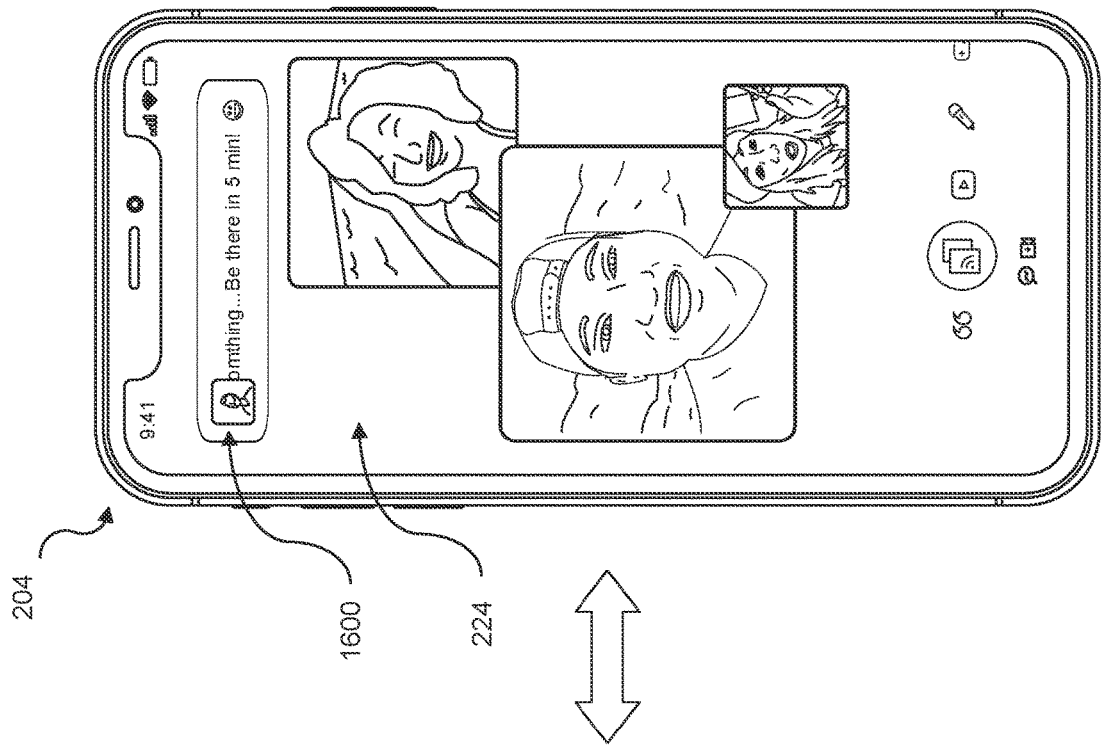
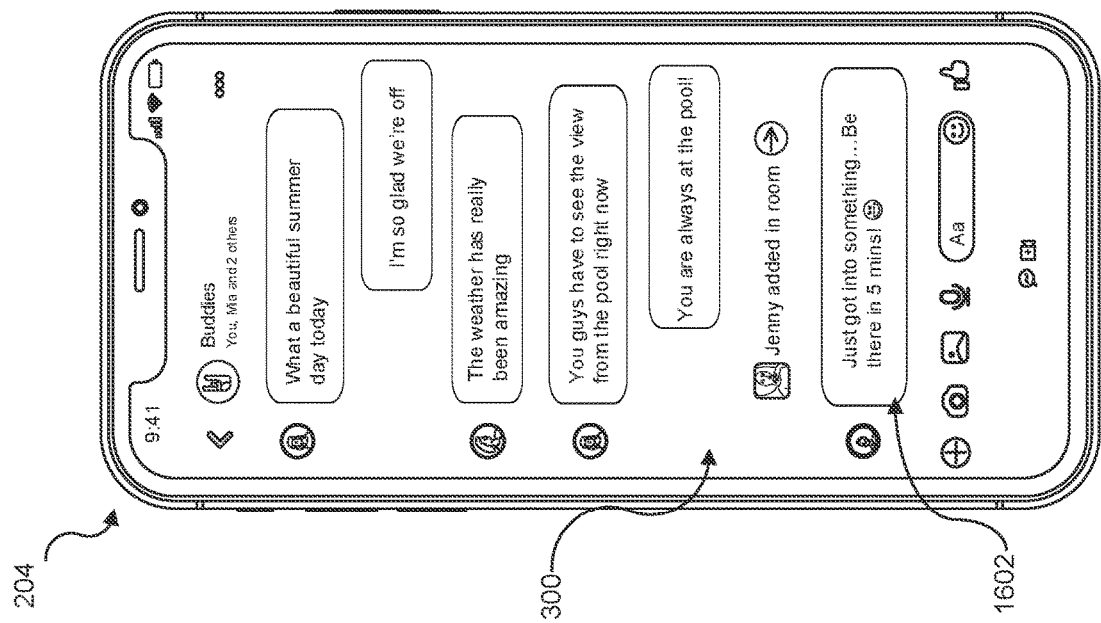
Fig. 16

PERSISTENT DIGITAL VIDEO STREAMING

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 16 is an illustration of an exemplary message in a messaging interface and corresponding content from the message displayed as an alert in a corresponding live-state interface.

Figure 1:
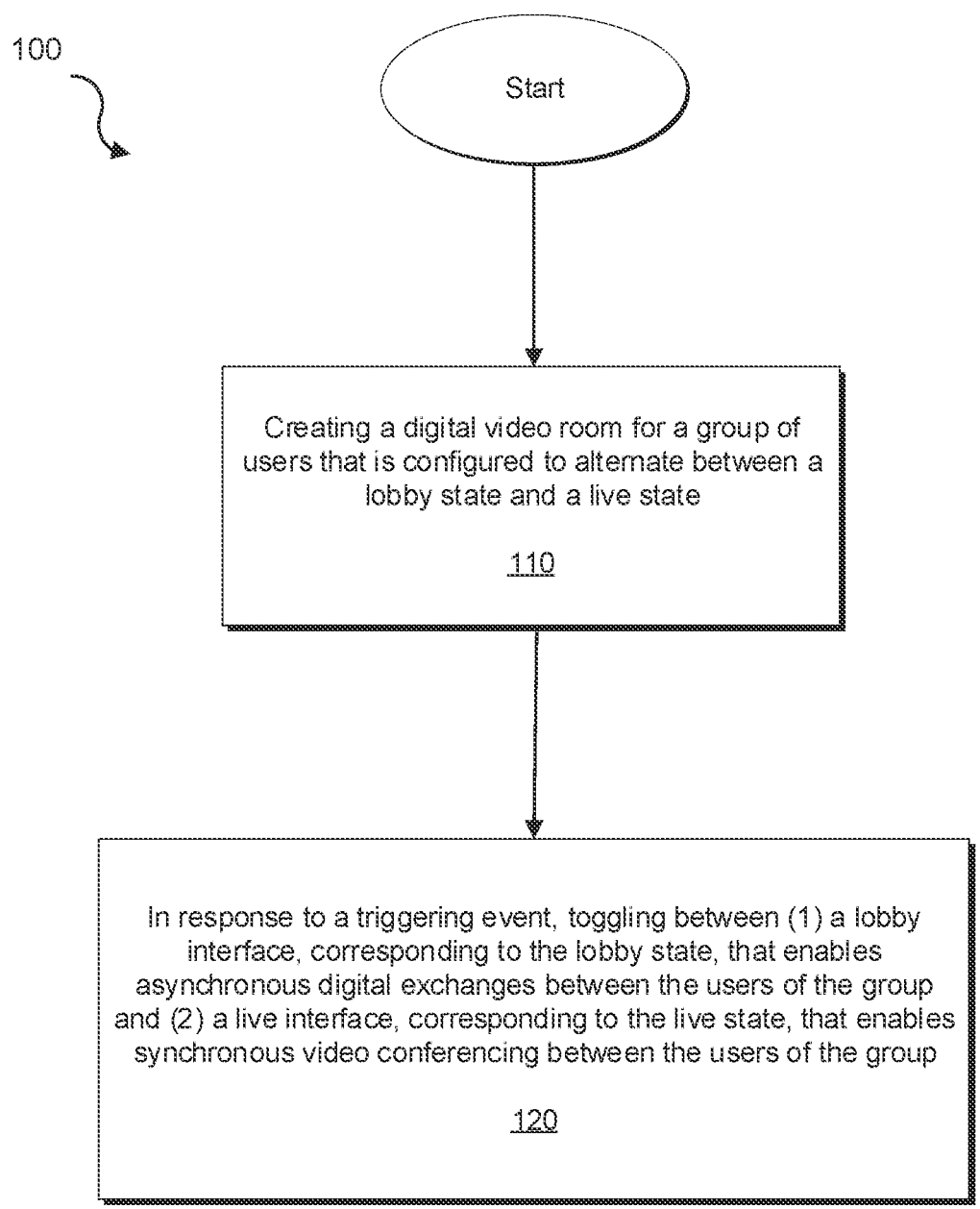
FIG. 1 is a flow diagram of an exemplary method for creating and/or maintaining a persistent video streaming framework.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Traditional video conferencing may fail to enable digital communication for users that are not available at the same time or to enable persistent (e.g., non-ephemeral) communication. Responding to these limitations, the present disclosure identifies a need for improved systems and methods for video conferencing that enable asynchronous and persistent digital communication. As will be described in greater detail below, embodiments of the present disclosure describe a system that provides video conferencing via digital video rooms (e.g., group streaming spaces). In some examples, the system may automatically create a digital video room for each digital thread in a platform (e.g., each group messaging chat, each comments thread, etc.). In one embodiment, a user may toggle between a digital thread and its associated digital video room by swiping (e.g., left to view an interface of the digital thread and right to view an interface of the digital video room).

Unlike traditional streaming spaces that die after a video conference ends, the disclosed digital video room may persist beyond the duration of a video conference (e.g., as long as a corresponding digital thread is active). The disclosed digital video room may alternate between two states: a "lobby state" directed at enabling asynchronous communication and a "live state" directed at enabling synchronous communication. In some examples, the communications exchanged via the lobby state may be persistent (e.g., available for consumption after the exchange occurs) and the communications exchanged via the live state may be ephemeral (e.g., streamed for consumption in real-time but unavailable once the time has passed). In other examples, the communications exchanged via the live state may also be recorded and maintained persistently for later consumption.

The lobby state may be accessed via a lobby interface with a home screen that includes a user tile for each user in a group corresponding to the digital video room. A user tile may include a variety of content, such as a snapshot from a most recent video conference, a video message, and/or an audio message, and may be user-generated and/or automatically generated for a user. If a user accesses a lobby interface, other users of the group may be notified (e.g., via a push notification and/or an alert).

The live state may be accessed via a live interface with a group streaming space for streaming real-time user video content for two or more users, enabling live video conferencing. In some examples, each user may be represented in the live interface by a dynamic tile that streams the user's real-time video stream when the user is participating in a video conference. If a user is not participating, the user's dynamic tile may include an image, the user's name, and/or a timestamp of the user's last visit to the digital video room.

The live interface may include a variety of features that enhance real-time communication between users. For example, an in-call dual-camera mode may enable a user to simultaneously stream video from both a front-facing and back-facing camera of the user's device. As another example, a group-view mode may enable users to share group content (e.g., a webpage and/or content from a user's device) while live streams of participating users' faces are presented alongside the shared content (e.g., facilitating watching a film together as a group). In some embodiments, a "closed collection surface" feature may enable a user to store content (e.g., media, links, etc.) in a designated location that may be easily shared with the user's contacts (e.g., that may be accessed and pulled from during a live video conference). In one embodiment, a "nearby chats" feature may enable location-centric digital video rooms, in which a digital video room is open to only users within a defined geographic region (e.g., an airport).

As will be explained in greater detail below, embodiments of the present disclosure may improve the field of videotelephony by providing streaming spaces that maintain persistent content, enabling both synchronous and asynchronous digital communication. Embodiments may improve the functioning of a computer itself by improving data organization, enabling cohesive navigation between related services of a platform (e.g., a text-based messaging service, a newsfeed service, a video conferencing service, etc.).

The following will provide, with reference to FIG. 1, detailed descriptions of computer-implemented methods for creating and maintaining a video streaming framework that enables both synchronous and asynchronous digital communication. Detailed descriptions of corresponding example systems will also be provided in connection with FIG. 2. Detailed descriptions of corresponding interfaces will be provided in connection with FIGS. 3-18.

FIG. 1 is a flow diagram of an exemplary computer-implemented method 100 for creating and/or maintaining a video streaming framework that enables both synchronous and asynchronous digital communication. The steps shown in FIG. 1 may be performed by any suitable computer-executable code and/or computing system, including the system(s) illustrated in FIG. 2. For example, the steps shown in FIG. 1 may be performed by modules operating in a server 202 and/or modules operating in a user device 204 (e.g., as shown in exemplary system 200 in FIG. 2). In one example, each of the steps shown in FIG. 1 may represent an algorithm whose structure includes and/or is represented by multiple sub-steps, examples of which will be provided in greater detail below.

Server 202 generally represents any type or form of backend computing device that may perform one or more functions directed at digital social networking. In some examples, server 202 may operate in connection with a social media platform 206. Although illustrated as a single entity in FIG. 2, server 202 may include and/or represent a group of multiple servers that operate in conjunction with one another.

User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc.

In some examples, a user 208 of user device 204 may be a member of social media platform 206. In these examples, user device 204 may have installed an instance of a social media application 210, which may operate as part of social media platform 206 and through which one or more services provided by server 202 may be accessible. Additionally or alternatively, user device 204 may have installed a browser that may navigate to one or more webpages maintained by social media platform 206, through which one or more services provided by server 202 may also be accessible.

Social media platform 206 may provide a variety of services for the users within its network (e.g., via server 202). In one example, social media platform 206 may provide a newsfeed service. The term "newsfeed" may generally refer to any type or form of social media consumption channel that presents a scrollable collection of newsfeed posts within a newsfeed interface. In some examples, a newsfeed may scroll (e.g., upward or downward) to reveal different posts within the newsfeed, in response to receiving user scrolling input. In one example, the scrollable collection may include a collection of newsfeed posts created by contacts of a particular user (e.g., friends of the particular user). The term "newsfeed post" generally refers to any type or form of digital composition that may be displayed in a newsfeed. Newsfeed posts may include, without limitation, text-based compositions, media-based compositions (which may include either a single media item or a collage of multiple media items), and/or a link to an online article. The newsfeed service may enable viewers of a newsfeed post to comment on the post, via a text and/or image-based reply, creating a digital thread of comments.

As another example, social media platform 206 may provide a digital story service. The digital story service may provide users with a story consumption channel, which presents a continuous series of digital story posts to a story-consumer, one by one. The term "digital story post" may generally refer to any type or form of social media post intended for a story consumption channel. A digital story composition may include a variety of content (e.g., a digital photograph, a graphic, text, a digital video and/or a digital recording of a music composition). In one example, the story consumption channel may transition from presenting one digital story post to the next automatically, without requiring any user input to do so. In some examples, digital story posts from a same source (e.g., created and/or posted by a same user) may be grouped together within the story consumption channel, such that each digital story post from a particular source is displayed prior to displaying digital story posts from another source. In one embodiment, a digital story post may be ephemeral. That is, the digital story post may only be viewable for a predetermined amount of time. For example, a digital story composition may be set to disappear after twenty-four hours. Similar to the newsfeed service, the digital story service may enable viewers of a story post to comment on the post, via a text and/or image-based reply and/or reply story, creating a digital thread of comments.

As another example, social media platform 206 may provide a messaging service. The term "messaging service" may generally refer to any type or form of digital message delivery system that enables users of social media platform 206 to exchange messages (e.g., text messages and/or group chats) within a private message thread. These messages may include a variety of content (e.g., a text, link, live video, voice recordings, etc.).

In some examples, as discussed throughout the present disclosure, social media platform 206 may provide a video conferencing service. In these examples, the video conferencing service may operate as a stand-alone service and/or may be integrated with another service (e.g., a messaging service, a newsfeed service, a digital story service, etc.).

The term "video conferencing service" refers to any type or form of streaming and/or videotelephony service that enables the digital transmission and/or sharing of real-time video streams and/or audio streams (e.g., from multiple endpoints) via a video conferencing interface. The term "real-time video stream" generally refers to any type or form of multimedia that is transmitted in real time, as a series of frames, from an endpoint (i.e., transmitting device) to one or more additional endpoints. Each frame may be displayed by an endpoint (to a user) as the frames are received (i.e., without waiting for the entire series of frames to be received).

Figure 2:
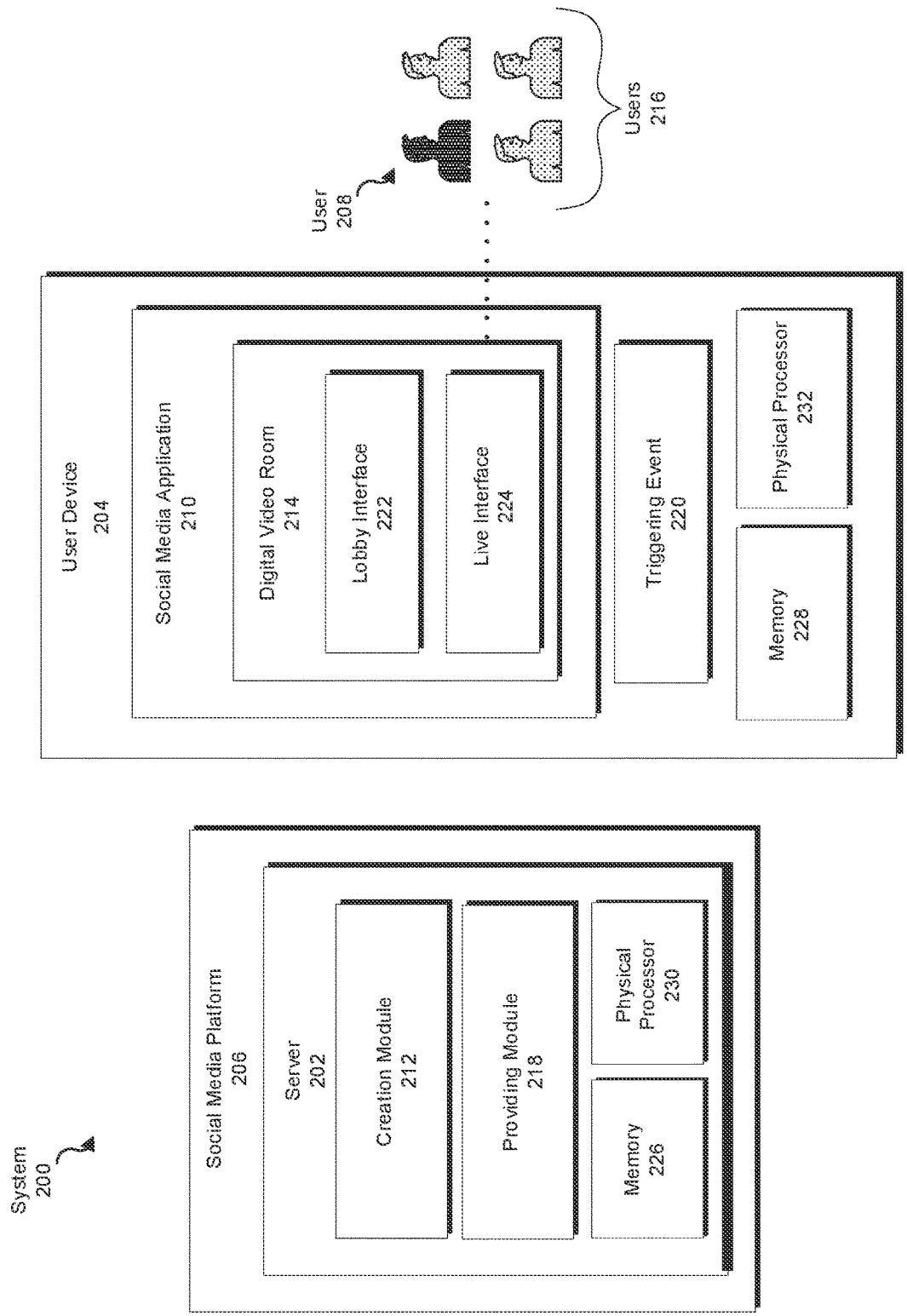
FIG. 2 is a block diagram of an exemplary system for creating and/or maintaining a persistent video streaming framework.
Figure 3:
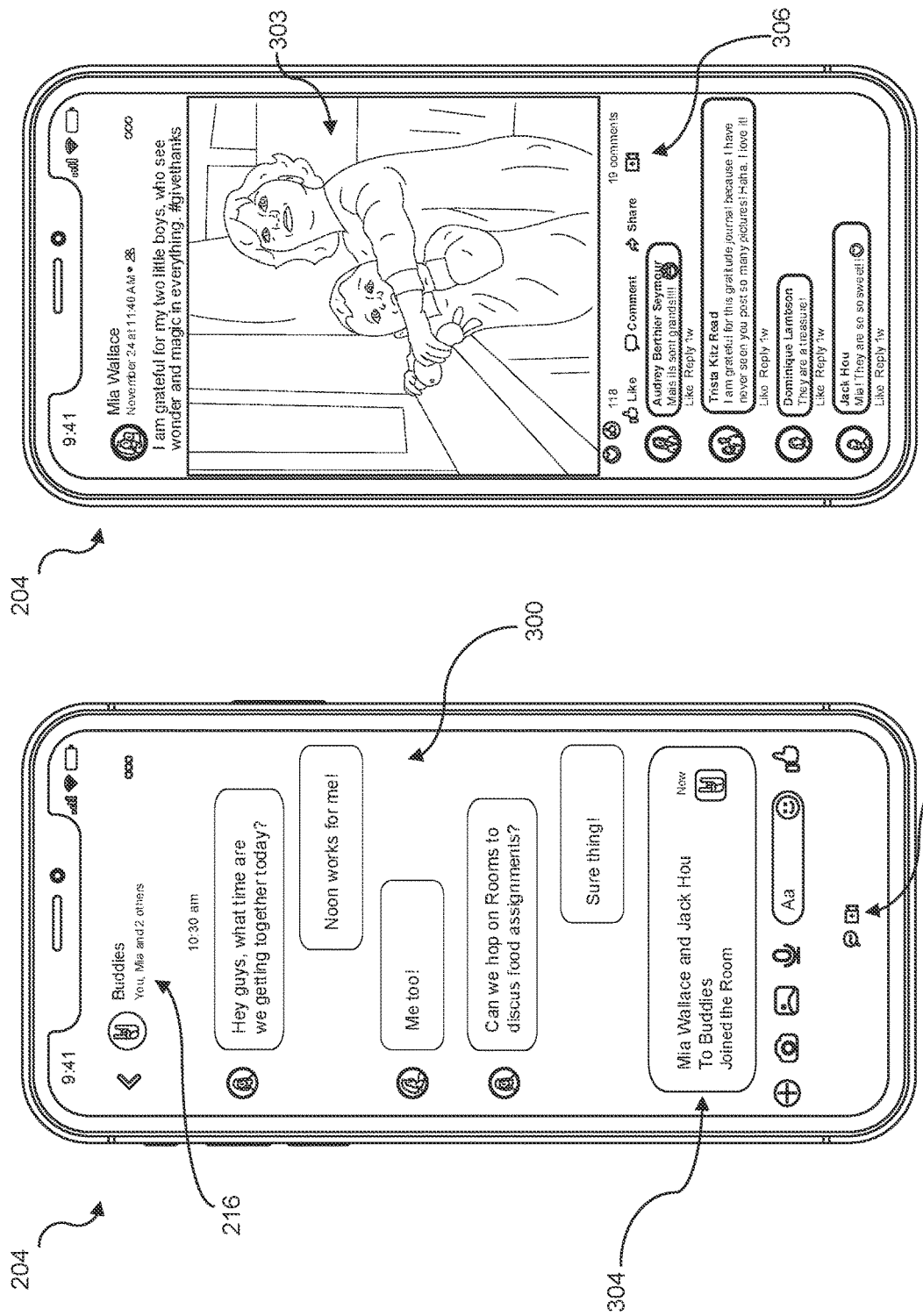
FIGS. 3A-3B are illustrations of exemplary digital threads for which a corresponding digital video room may be created.

Returning to FIG. 1, at step 110, one or more of the systems described herein may create a digital video room for a group of users that is configured to alternate between a lobby state and a live state. For example, as illustrated in FIG. 2, a creation module 212 may create a digital video room 214 for a group of users 216 that is configured to alternate between a lobby state and a live state. The term "digital video room" may refer to a set of one or more interfaces that include a group streaming space for live videoconferencing. In some examples, the interfaces of a digital video room may be persistent. That is, the interfaces may not expire automatically (e.g., in response to a videoconference ending).

Creation module 212 may operate in a variety of contexts. In some examples, creation module 212 may operate as part of a video conferencing service. Additionally or alternatively, creation module 212 may operate as part of a platform (e.g., social media platform 206) that provides video conferencing as a standalone service and/or as a supplemental service integrated with another service (e.g., integrated with a messaging service, a newsfeed service, a digital story service, a photo-sharing service, etc.).

Creation module 212 may create digital video room 214 in response to a variety of triggers (e.g., depending on the context in which creation module 212 operates). In some examples, creation module 212 may create digital video room 214 in response to user input directly requesting that digital video room 214 be created. In these examples, the user input may include a selection of a variety of user-selectable settings for digital video room 214 (e.g., users to include as participants to digital video room 214, a name for digital video room 214, etc.).

Figure 12:
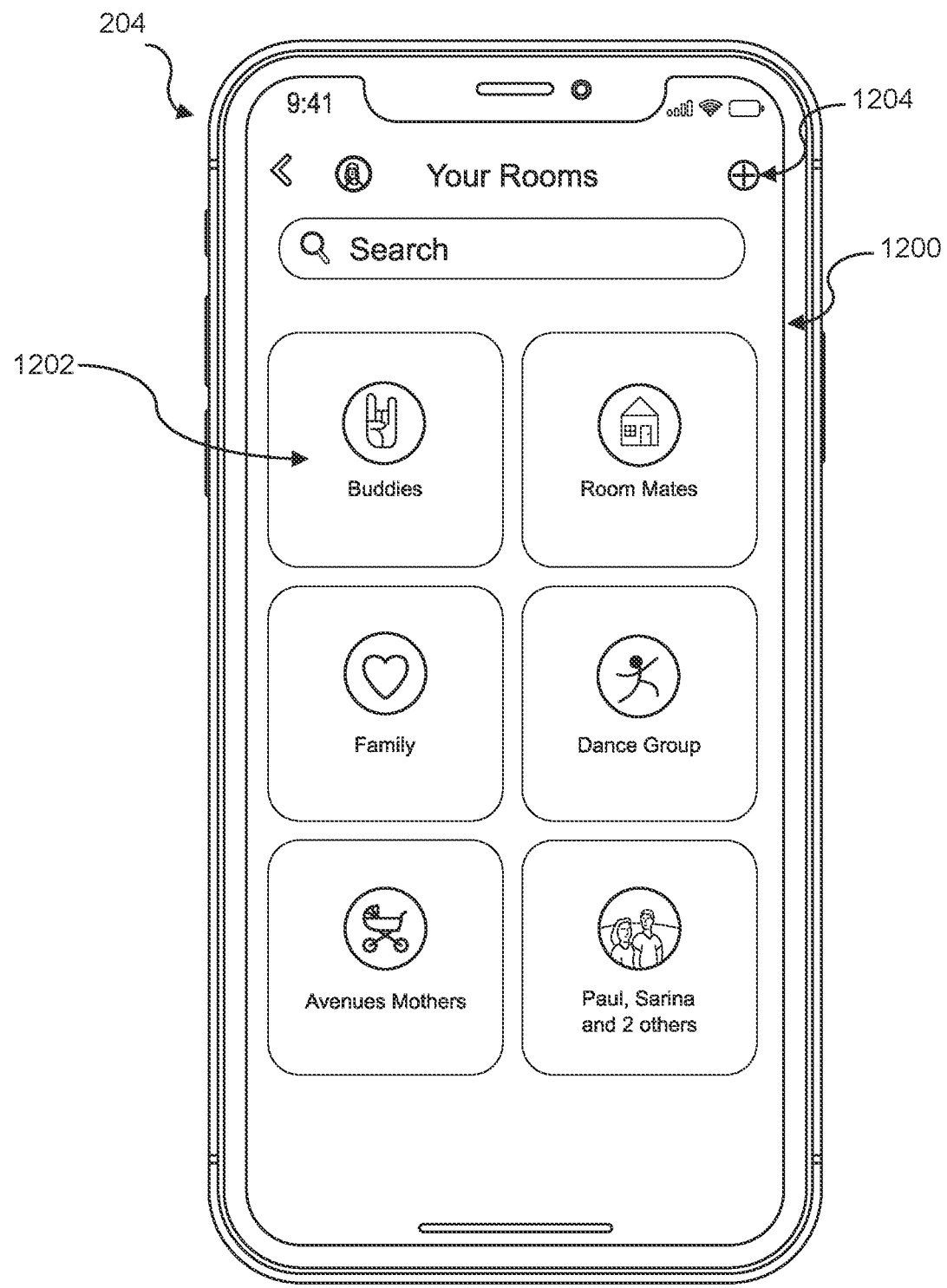
FIG. 12 is an illustration of an exemplary video room digest interface.

In one embodiment, user input initiating the creation of digital video room 214 may be received via a video room digest interface and/or a dedicated video room creation interface (e.g., via a creation element such as element 1204 shown in FIG. 12). Additionally or alternatively, in examples in which creation module 212 operates as part of a supplemental service integrated with a primary service, such user input may be received via an interface of the primary service (e.g., via a creation element displayed within a group chat interface and/or a newsfeed interface). In one embodiment, a creation element may be associated with a group (e.g., may be displayed within a group chat interface) and a resulting digital video room (e.g., digital video room 214) may automatically be configured to include, as members of the digital video room, the members of the associated group.

In addition, or as an alternative, to creating digital video room 214 in response to a direct user request, creation module 212 may create digital video room 214 automatically in response to a computer-detectable event. For example, in examples in which creation module 212 operates as part of social media platform 206, creation module 212 may automatically create digital video room 214 for users 216 in response to determining that users 216 have formed a digital association (e.g., a group) via a service of social media platform 206. In one such example, creation module 212 may automatically create a digital video room for each digital thread created and/or maintained via social media platform 206, automatically configuring a digital video room with a membership that includes and/or consists of the members and/or participants of its corresponding digital thread. The term "digital thread" may refer to any series of related digital exchanges (e.g., a thread of messages in a group chat and/or a group text and/or a thread of comments responding to a digital social media post). In this example, creation module 212 may identify a digital thread with users 216 as participants (e.g., in response to the digital thread being created) and may automatically create digital video room 214 to correspond to the identified digital thread in response to identifying the same.

FIG. 3A illustrates an exemplary embodiment of a digital thread of messages between users 216 displayed in a group chat interface 300. Using FIG. 3A as a specific example, creation module 212 may automatically create digital video room 214, with the members of the group chat 300 as participants, in response to identifying the group chat and/or in response to receiving user input to a video room element 302. FIG. 3B illustrates an exemplary embodiment of a digital thread of comments to a social media post 303 posted by users 216. In this embodiment, creation module 212 may automatically create digital video room 214, with the users who have commented on social media post 303 as participants, in response to identifying the comments thread and/or in response to receiving user input to a video room element 306.

In some embodiments in which digital video room 214 corresponds to a digital thread, creation module 212 may automatically update the membership of digital video room 214 to continually coincide with the membership of the digital thread (e.g., in response to identifying a change in the membership of the digital thread). In some examples, creation module 212 may maintain digital video room 214 as long as the digital thread is active (e.g., until and/or unless the digital thread is deleted).

In addition, or as an alternative, to automatically creating a digital video room to correspond to a digital thread, creation module 212 may automatically create a digital video room to correspond to other digital groups and/or group based content. For example, creation module 212 may automatically create a digital video room to correspond to a group social media composition (e.g., with contributors to the composition as participants to the digital video room), a group digital story (e.g., with contributors to the group digital story as participants to the digital video room), a group photo album (e.g., with contributors and/or users with access rights to the album as participants to the digital video room), and/or a group videogame (e.g., with participants to the videogame as participants to the digital video room). In such examples, creation module 212 may also automatically update the membership of the digital video room based on a change in membership of the associated group and/or group content and/or may maintain a digital video room as long as the associated group and/or group content is active.

Digital video room 214 may be created with a variety of configurations that enable persistent and/or asynchronous digital communication. In some examples, digital video room 214 may operate in two different states: (1) a lobby state, which enables users 216 to digitally connect asynchronously, and (2) a live state, which enables synchronous video conferencing. Each state may be accessed via one or more interface, as will be described in greater detail in connection with step 120.

Returning to FIG. 1, at step 120, one or more of the systems described herein may, in response to a triggering event, toggle between providing (1) a lobby interface, corresponding to the lobby state, that enables asynchronous digital exchanges between the users of the group, and (2) a live interface, corresponding to the live state, that enables synchronous video conferencing between the users of the group. For example, as illustrated in FIG. 2, a providing module 218 may, in response to a triggering event 220, toggle between providing a lobby interface 222 and a live interface 224.

Figure 4:
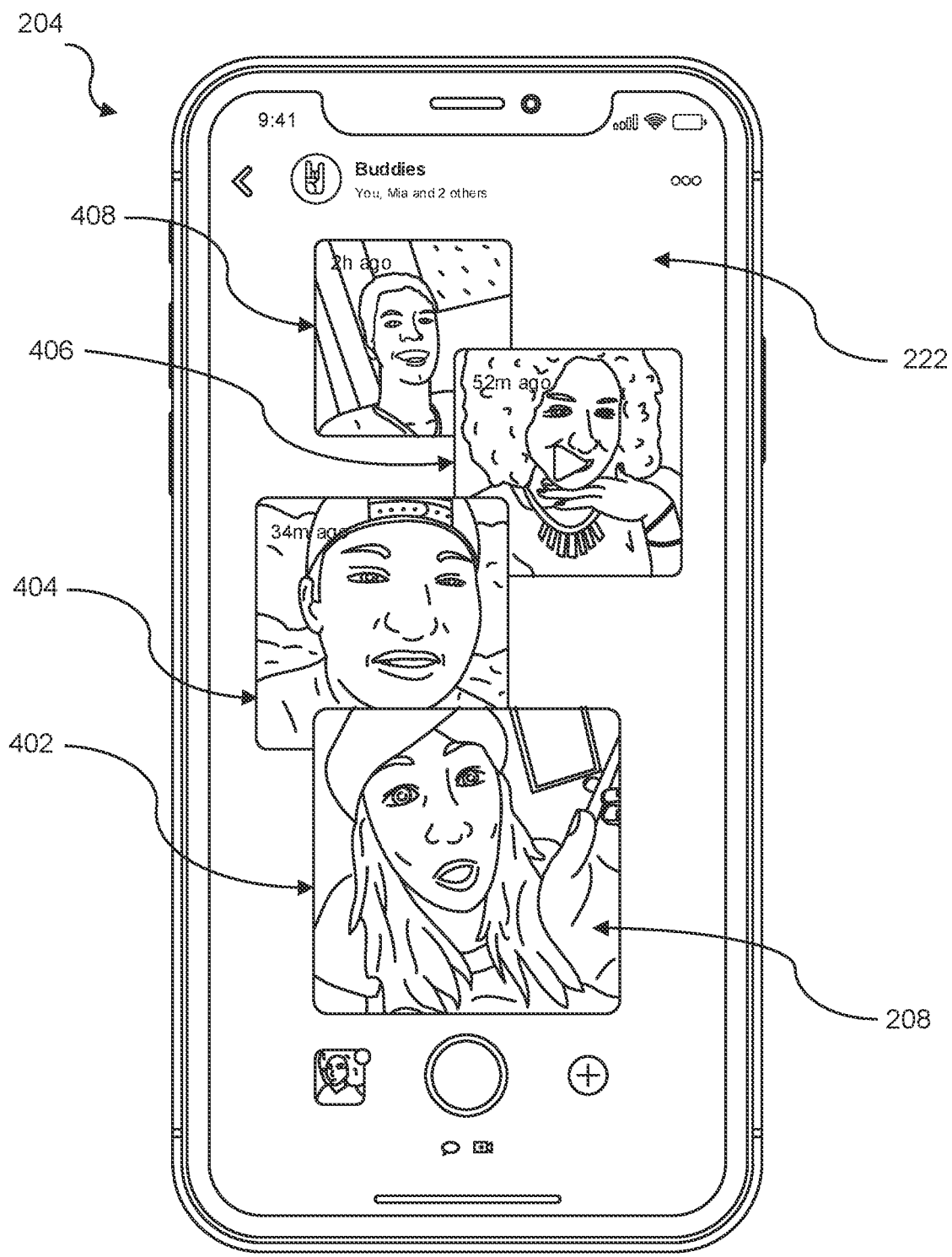
FIG. 4 is an illustration of an exemplary lobby-state interface of a digital video room.

Lobby interface 222 may be configured in a variety of ways and may provide a variety of features directed to asynchronous (e.g., persistent) communication. In some examples, lobby interface 222 may include a home screen (e.g., a default landing screen) that displays a user tile for each user in the group of users 216. FIG. 4 illustrates an exemplary embodiment of a lobby home screen of lobby interface 222 with user tiles 402, 404, 406, and 408. Each user tile may present a variety of content. For example, a user tile may present a thumbnail of a digital artifact left by its corresponding user, such as a video message, an audio message, and/or an avatar message (e.g., a message delivered by an animated graphical representation of the user that moves in sync with an audio recording of the user). Additionally or alternatively, a user tile may include a user's activity status delineating the status of the user with regards to digital video room 214 (e.g., "watching," "offline," "in live video conference," etc.).

In some examples, a user tile may include a presence snapshot. The presence snapshot may represent a snapshot of a camera frame (e.g., a last camera frame) from a user's most recent live video appearance to digital video room 214. In one example, a user tile may include a music player associated with the user. The music player may include a link to music associated with the user (e.g., being currently listened to by the user and/or posted to the group by the user). Additionally or alternatively, a user tile may include a graphic (e.g., a doodle drawn by a user), a profile image, and/or a user-generated poll.

Figure 5:
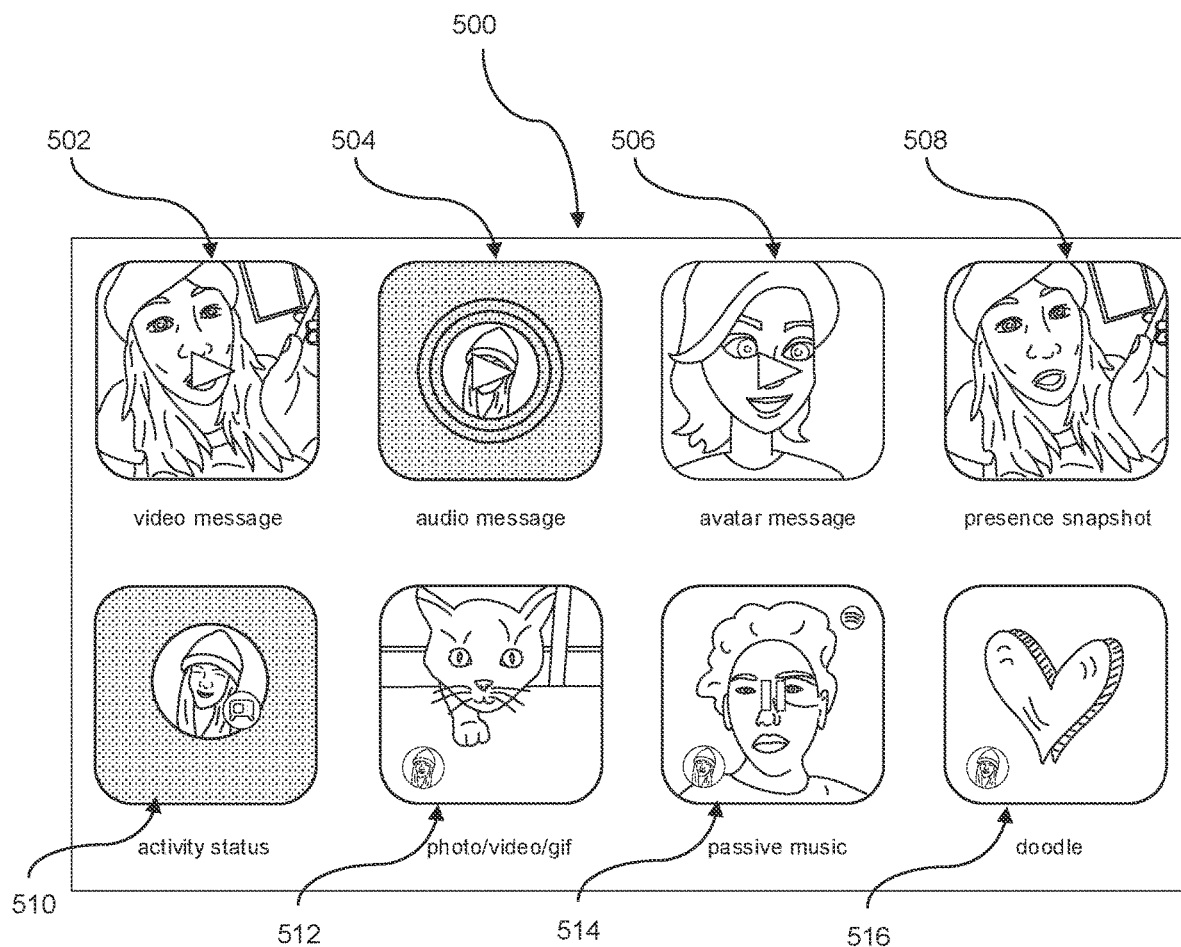
FIG. 5 is an illustration of exemplary user tiles for a lobby-state interface.

FIG. 5 illustrates a collection of exemplary user tiles 500 including a video message user tile 502, an audio message user tile 504, an avatar message user tile 506, a presence snapshot user tile 508, an activity status user tile 510, a content snapshot user tile 512, a passive music user tile 514, and a doodle user tile 516. In some examples (e.g., as depicted in FIGS. 4 and 5), each user tile may include a timestamp of the last time the user tile's corresponding user visited digital video room 214. This timestamp may be configured to represent the last time the user visited any interface of digital video room 214, visited lobby interface 222, and/or visited live interface 224.

Figure 6:
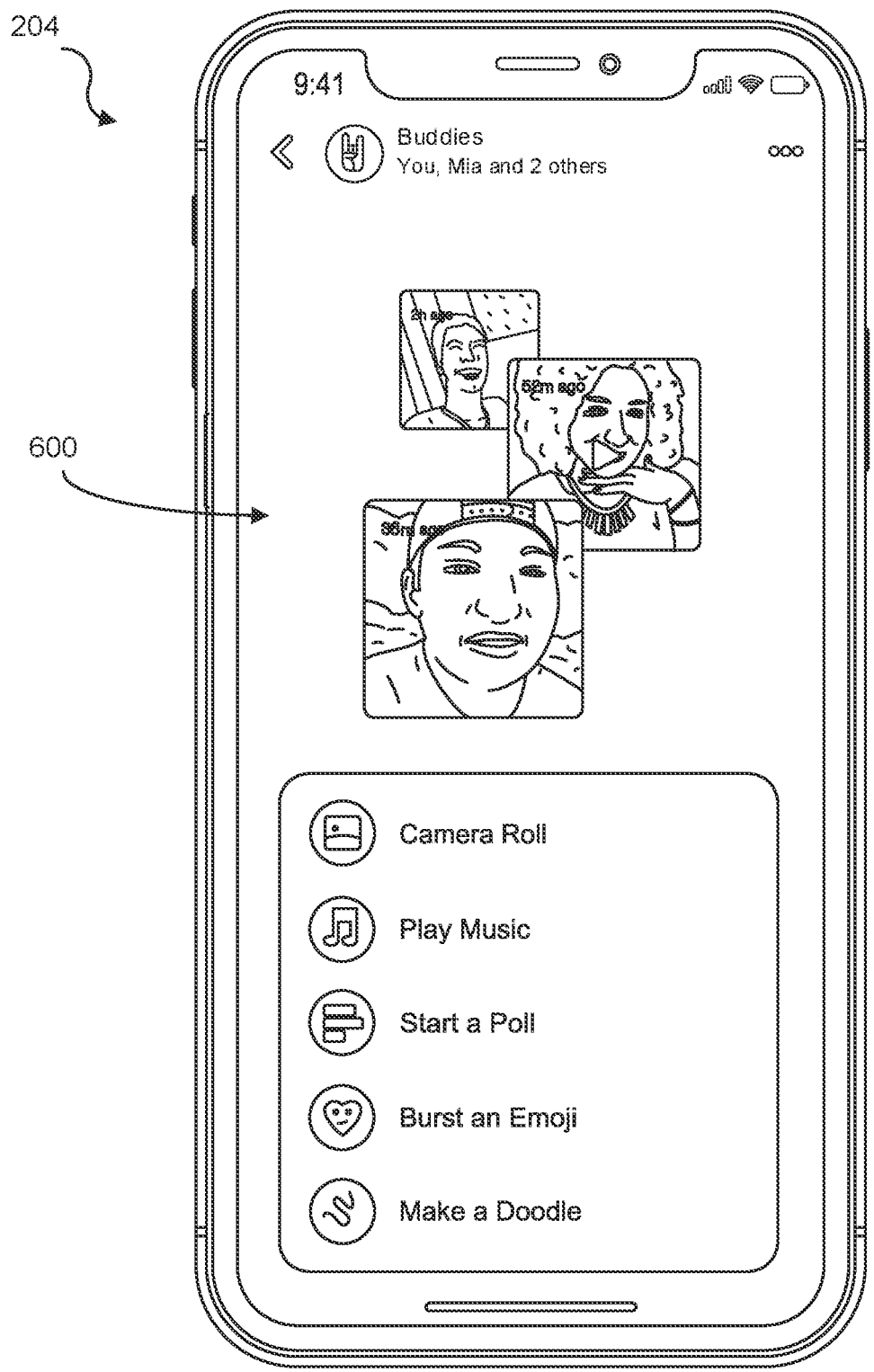
FIG. 6 is an illustration of an exemplary user tile creation interface.

The user tiles for a lobby home screen may be generated in a variety of ways. In some examples, a user tile may be automatically generated. For example, a tile creation module may automatically capture a presence snapshot during a live video conference (e.g., as permitted by a privacy setting) and create a user tile based on the same. Additionally or alternatively, a user tile may be created based on user input. FIG. 6 illustrates an exemplary tile creation interface 600 that a tile creation module may provide to a user wishing to provide content for his or her user tile. In these examples, the tile creation module may create a user tile based on user input selecting a type of user tile and/or based on content selected, created, and/or uploaded by a user via a tile creation interface.

A lobby home screen may arrange user tiles in any configuration. FIG. 4 depicts an embodiment in which user tiles are vertically staggered with the tile corresponding to user 208 (i.e., the user to whom the interface is being displayed) being displayed as the bottom most tile (user tile 402) and the remaining ascending order being based on a recency metric indicative of how recently a user last visited digital video room 214. In some examples, as shown in FIG. 4, a lobby home screen may consist of only one tile for each user. In other examples, a lobby home screen may include both a main set of user tiles, which may include one tile for each user with current content, and a scrollable history of user tiles (i.e., archived tiles that were previously within the main set). Additionally or alternatively, a timeline of user tiles from the lobby home screen (e.g., archived user tiles) may be included in a tile-archive interface.

Figure 7:
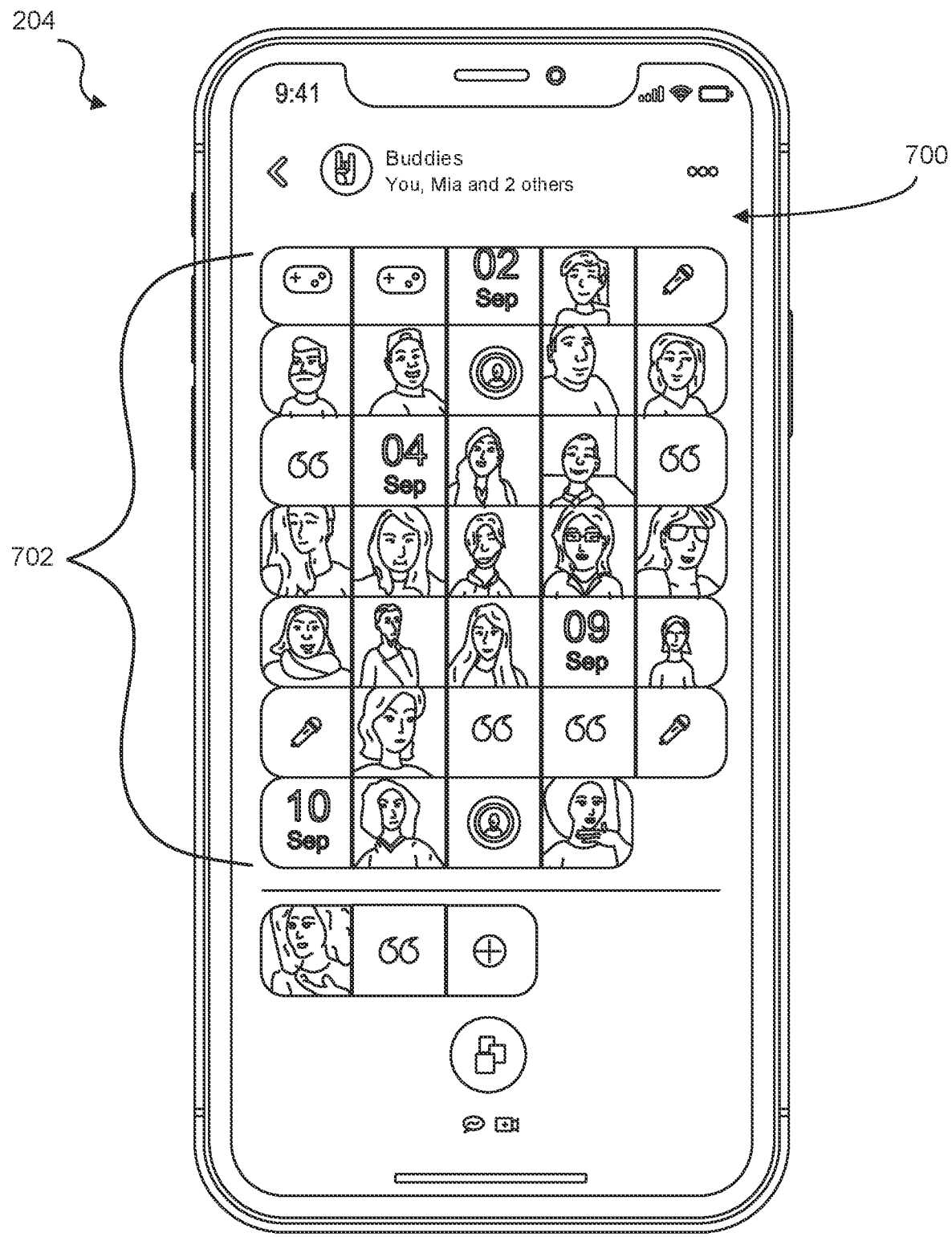
FIG. 7 is an illustration of an exemplary user tile archive interface in which user tiles are arranged in a cluster configuration.
Figure 8:
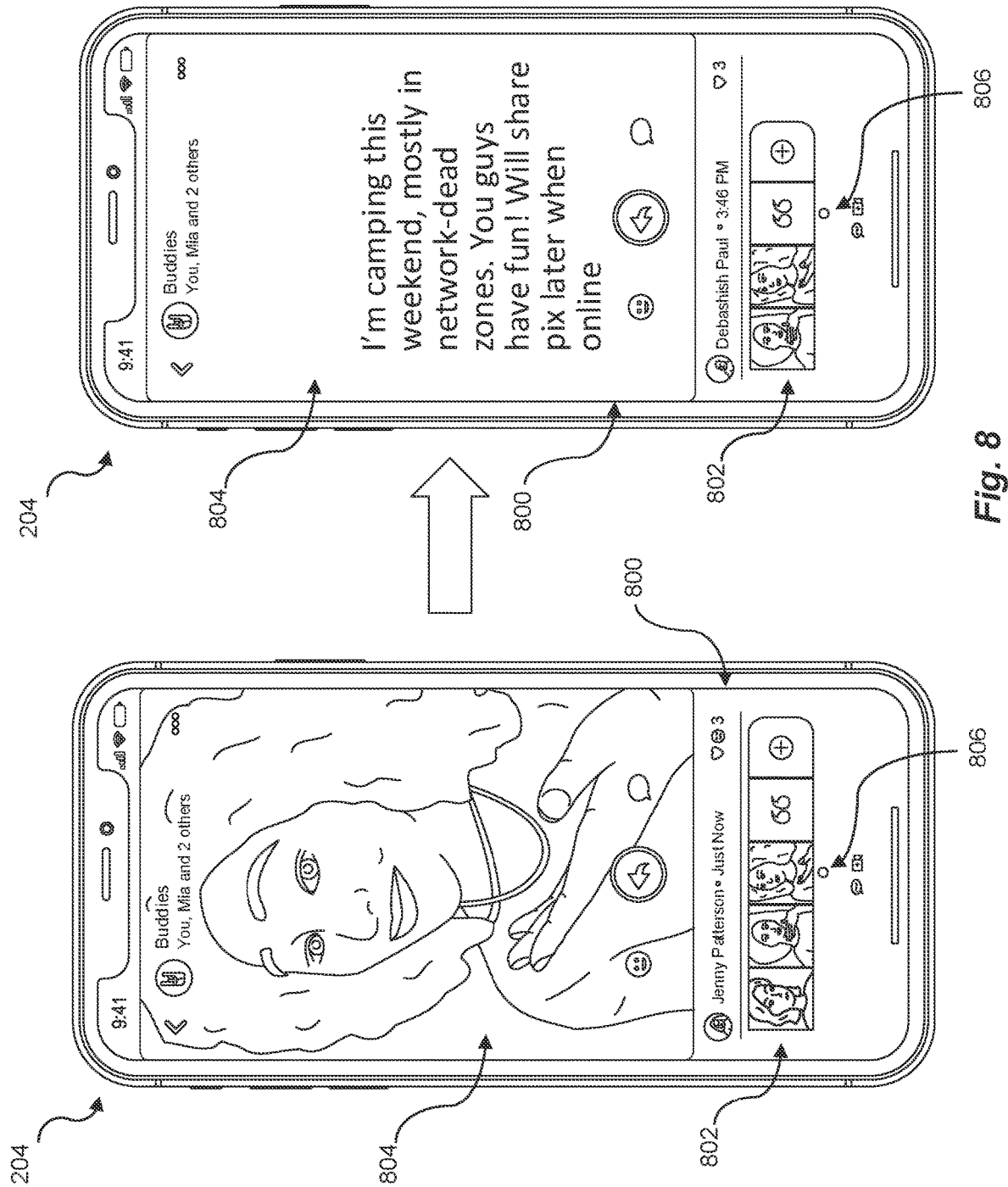
FIG. 8 is an illustration of an exemplary user tile archive interface in which user tiles are arranged linearly and displayed one by one.

A tile-archive interface may organize user tiles in a variety of ways. In some examples, user tiles may be organized in a cluster display that organizes user tiles by date. FIG. 7 illustrates an exemplary archive screen 700 in which a cluster 702 of user tiles are organized by date. Additionally or alternatively, user tiles may be organized into a serial display that presents user tiles one by one (e.g. in a slideshow format). FIG. 8 illustrates an exemplary archive screen 800 that includes (1) a summary ribbon 802 of user tiles and (2) a large-screen display 804 of one user tile. As shown in FIG. 8, summary ribbon 802 may scroll bidirectionally and the user tile that visually aligns with an indicator 806 may be depicted in large-screen display 804. In some examples, a selection via user input of a user tile from a cluster of a cluster display, and/or from a summary ribbon of a serial display, may trigger a full-screen display of the selected user tile to be displayed.

In some examples, digital video room 214 may be configured to promote serendipitous meetings via lobby interface 222 that may organically lead to live exchanges (e.g., via live interface 224), virtually mimicking the spontaneity of exchange afforded by real-world spaces, such as the lobby of a library and/or an office. For example, providing module 218 may be configured to inform a user accessing lobby interface 222 (e.g., viewing and/or creating content via lobby interface 222), via a digital alert in lobby interface 222, of other users accessing lobby interface 222, enabling and/or prompting users accessing lobby interface 222 at the same time to initiate a live exchange via live interface 2224.

Live interface 224 may be configured in a variety of ways and may provide a variety of video conferencing features. In one of its most basic implementations, live interface 224 may enable users participating in a video conference via live interface 224 to transmit live user streams (e.g., a live video stream and/or a live audio stream). In some examples, a live user stream may include an animation (e.g., an avatar and/or user-generated doodle corresponding to a user). In these examples, the animation may be configured to move in sync with real-time audio of the animation's corresponding user.

In some examples, live interface 224 may display each live user stream within a dynamic user tile. Dynamic user tiles may change positions within live interface 224 based on an activity metric (e.g., who is speaking, who has begun speaking who was previously not speaking, a volume at which a user is speaking, a type of speech being produced by a user such as laughter, shouting, or whispering, who has recently joined a video conference, and/or an amount that a user has spoken). As a specific example, the dynamic user tile of a user who has begun speaking may be moved to a position that is more prominent within live interface 224 than the dynamic user tile of a user who is not speaking.

Figure 9:
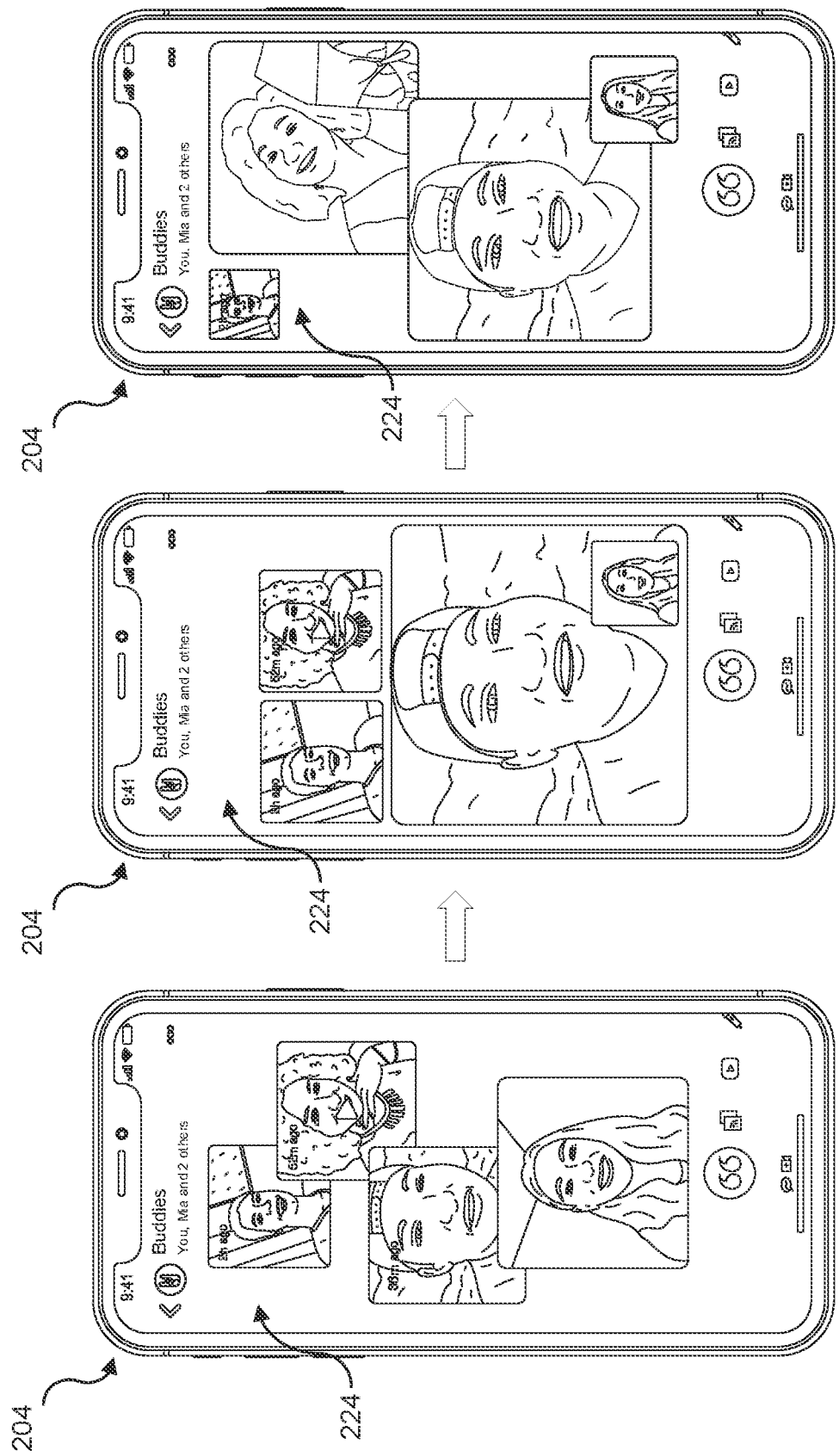
FIG. 9 is an illustration of an exemplary live-state interface of a digital video room.

In addition, or as an alternative, to changing positions, dynamic user tiles may change size within live interface 224 based on an activity metric. For example, the dynamic user tile of a user who is not logged into a live video conference may appear smaller than the dynamic user tile of a user who is logged into the live video conference. Similarly, the dynamic user tile of a user who is currently speaking may appear larger than the dynamic user tile of a user who is logged in but not currently speaking. FIG. 9 illustrates live interface 224 in an exemplary embodiment in which dynamic user tiles change position and size as additional users join a live video conference.

Figure 10:
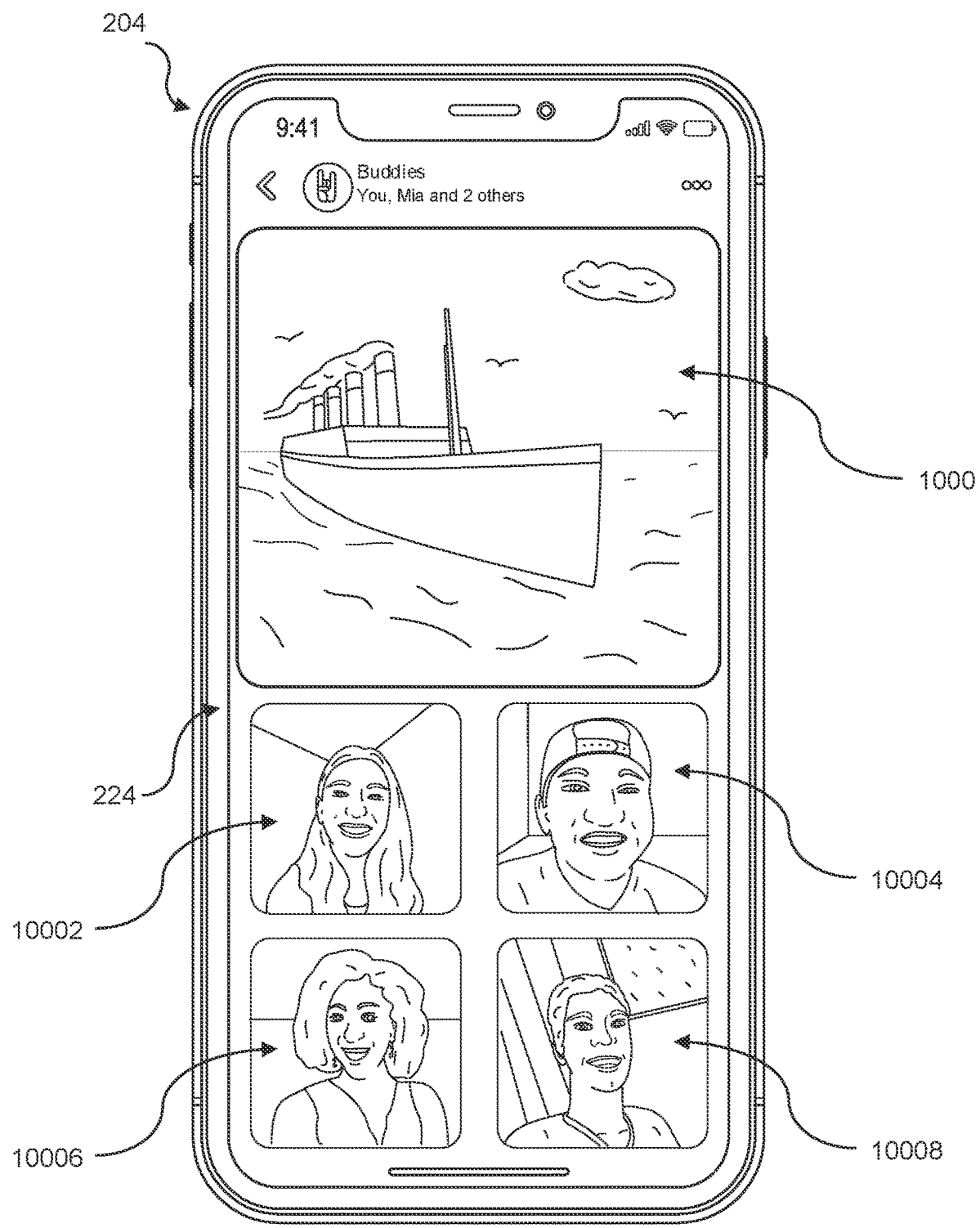
FIG. 10 is an illustration of an exemplary live-state interface that streams both group content and individual user streams.

In some examples, providing module 218 may also stream group content via live interface 224, in addition to streaming live user streams. Examples of group content may include, without limitation, a webpage, an image, a presentation, and/or a film. In some embodiments, providing module 218 may stream group content in response to receiving a link to the group content via user input, receiving the group content via a user upload, and/or receiving the group content via user screen-sharing. Streaming group content in addition to live user streams may enable a variety of virtual group activities, such as group shopping, a group discussion of a presentation, and/or group watching of a film. Such virtual group activities may mimic real-world engagement by enabling participants to simultaneously view both the group content and a live stream of other users physically responding to the group content. FIG. 10 illustrates an exemplary embodiment of live interface 224 in which group content 1000 (a film of a boat on the water) is displayed in addition to live user streams 1002-1008.

Figure 11:
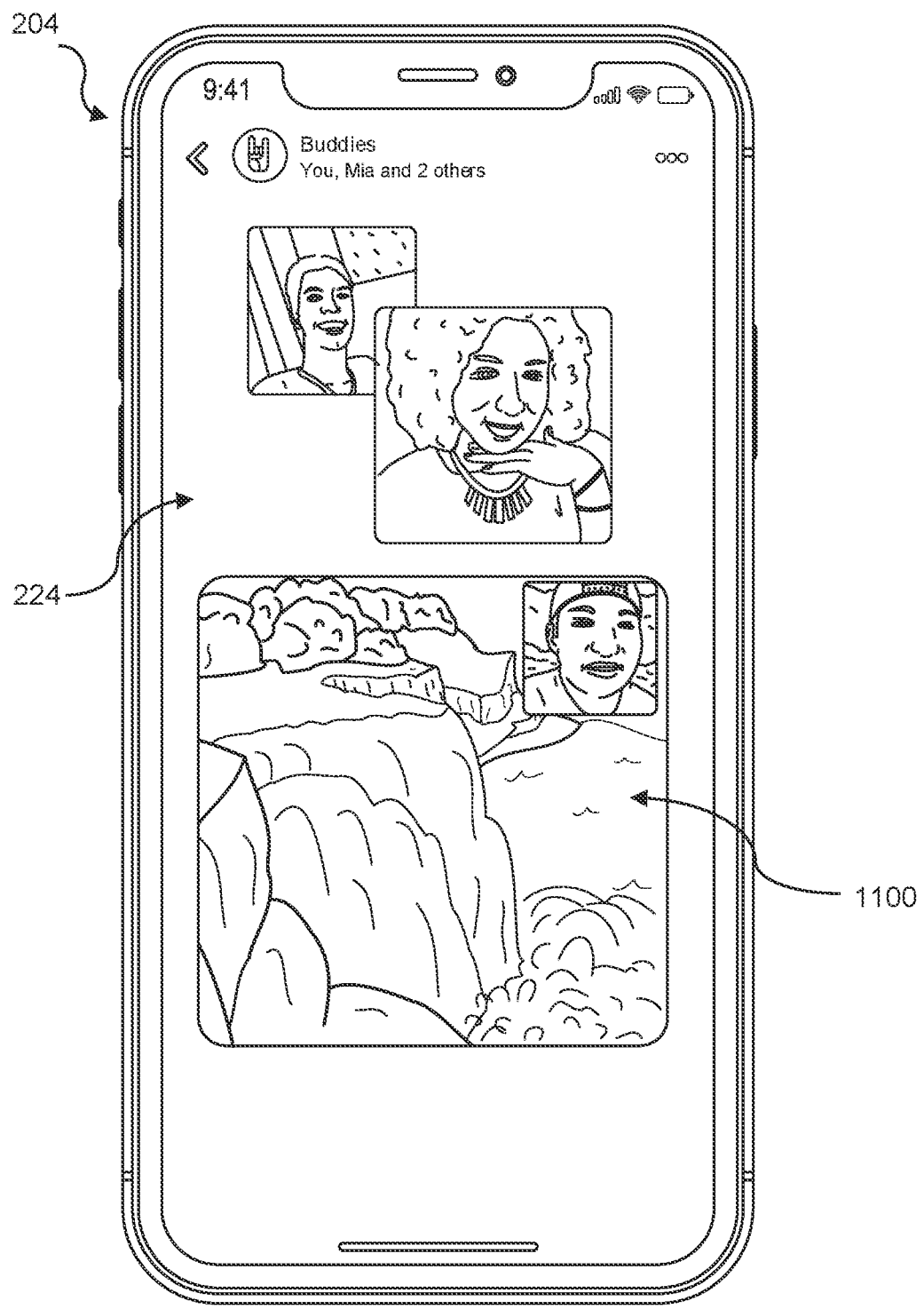
FIG. 11 is an illustration of an exemplary live-state interface that streams video from two cameras of a user device.

In some embodiments, providing module 218 may simultaneously transmit two related live media streams for a user within live interface 224 (e.g., a content stream and a user stream). In these embodiments, providing module 218 may receive, from a user within the group of users 216, video from both (1) a front-facing camera of the user's device and (2) a back-facing camera of the user's device and may simultaneously transmit, via live interface 224, both (1) a first live video stream with video from the front-facing camera of the user's device and (2) a second live video stream with video from the back-facing camera of the user's device. In some examples, one of live video streams may be superimposed over the other. For example, FIG. 11 illustrates an exemplary embodiment of live interface 224 in which a dynamic user tile 1100 includes, as a base image, a live video content stream from a back-facing camera of a user's device and, superimposed over the base image in the upper right-hand corner, a live video user stream from a front-facing camera of the user's device. Streaming video streams from both a front-facing and back-facing camera of a user's device may provide a more immersive experience to viewers of the video streams, by enabling viewers to see both (1) what a user is looking at and (2) the user's facial reaction to the same.

Providing module 218 may provide a user with access to digital video room 214 (e.g. by transmitting and/or presenting lobby interface 222 and/or live interface 224) in response to a variety of triggers. In some examples, providing module 218 may provide access to digital video room 214 in response to receiving user input requesting such access. Providing module 218 may receive such input in a variety of ways and via a variety of interfaces. For example, in one embodiment, providing module 218 may receive user input to access digital video room 214 via a video room digest interface, which provides a user with a list of video rooms that the user has rights to access. In this embodiment, the user input may select a selectable element associated with digital video room 214. FIG. 12 illustrates an exemplary video room digest interface 1200 in which a variety of digital video rooms to which user 208 has access rights are presented as selectable elements (e.g., a selectable video room element 1202 corresponding to an exemplary embodiment of digital video room 214).

Figure 13:
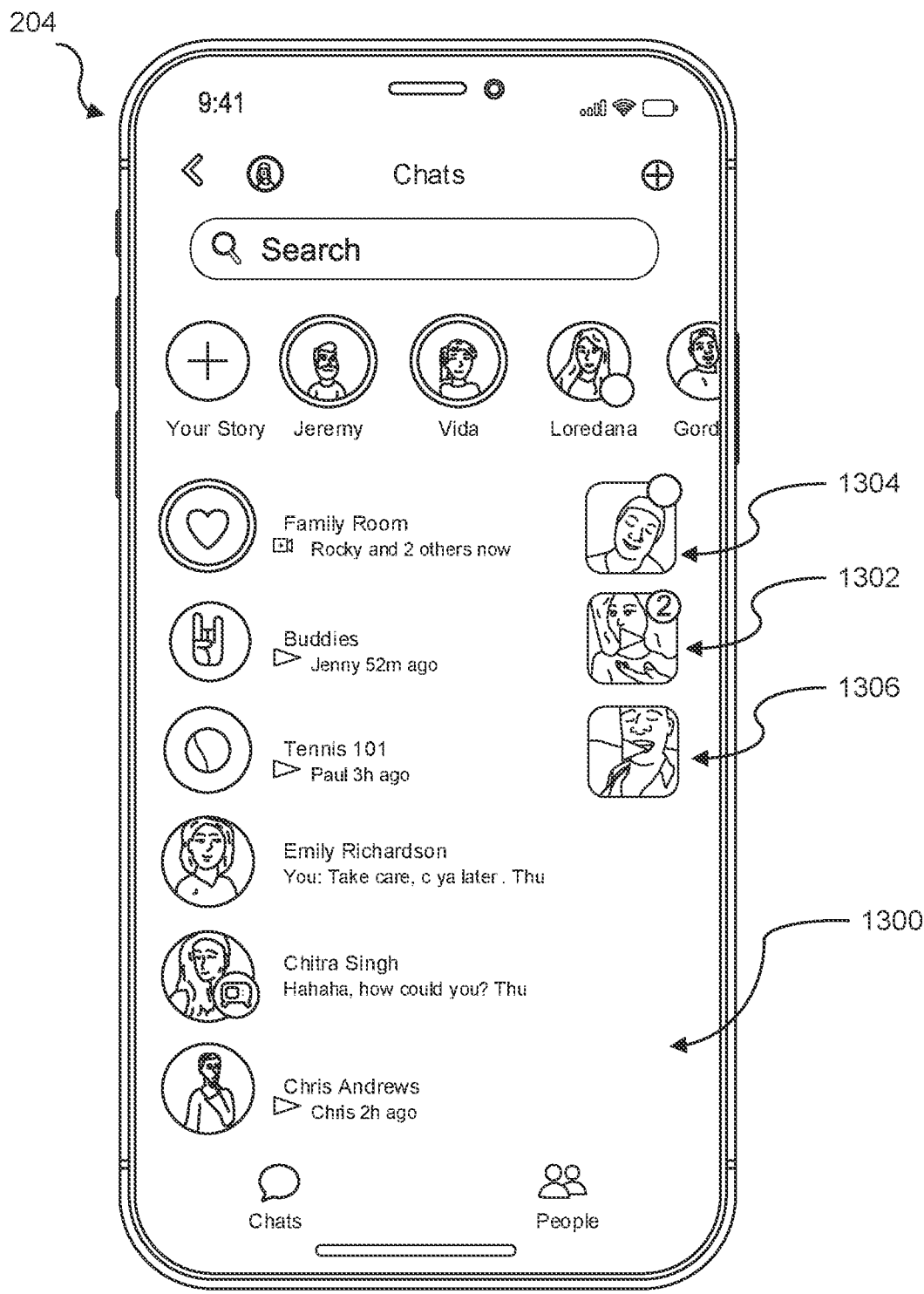
FIG. 13 is an illustration of an exemplary thread display with selectable elements that provide access to a video room.
Figure 14:
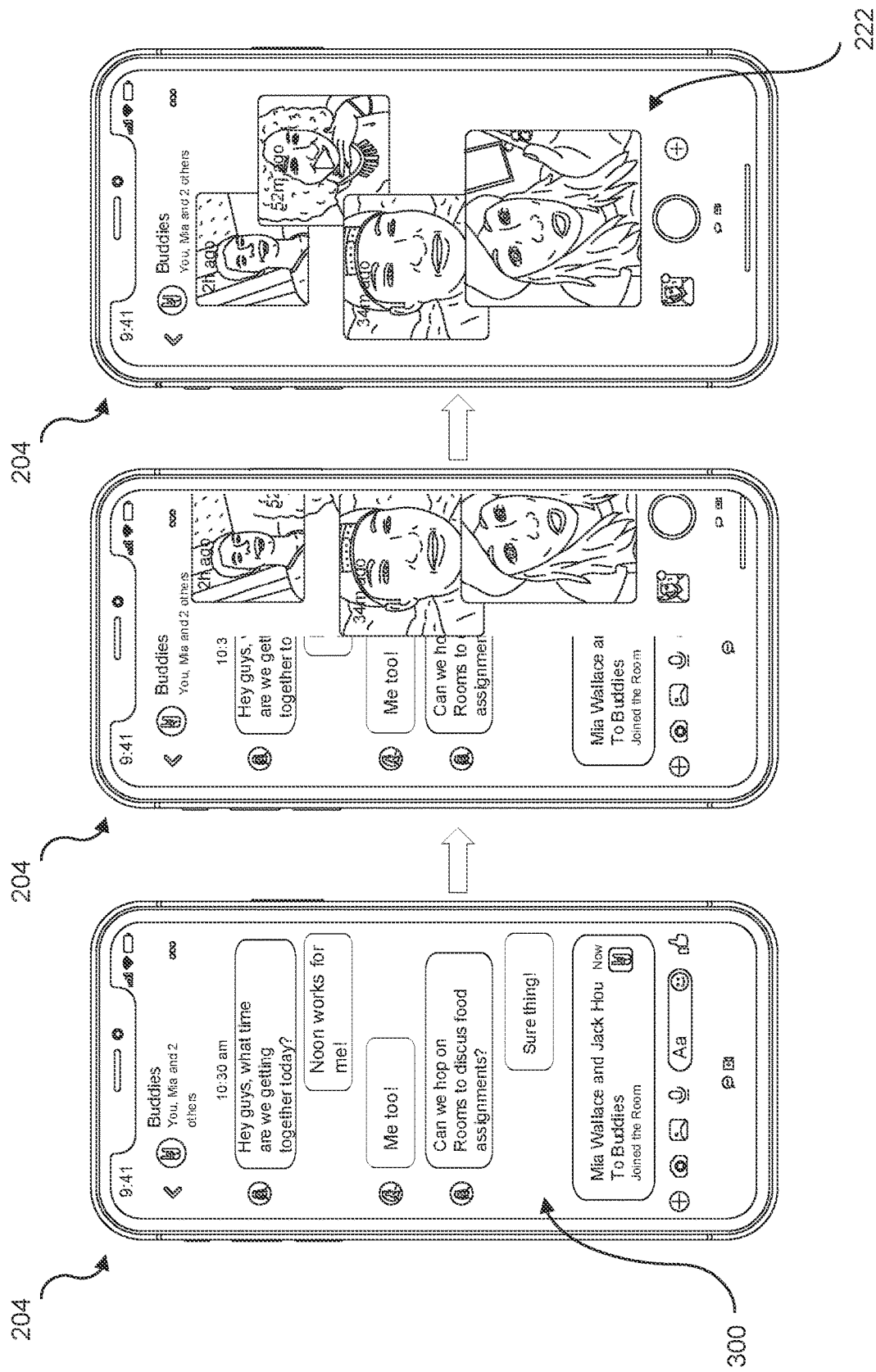
FIG. 14 is an illustration of an exemplary interface transitioning from displaying a digital thread to displaying a corresponding digital video room.
Figure 15:
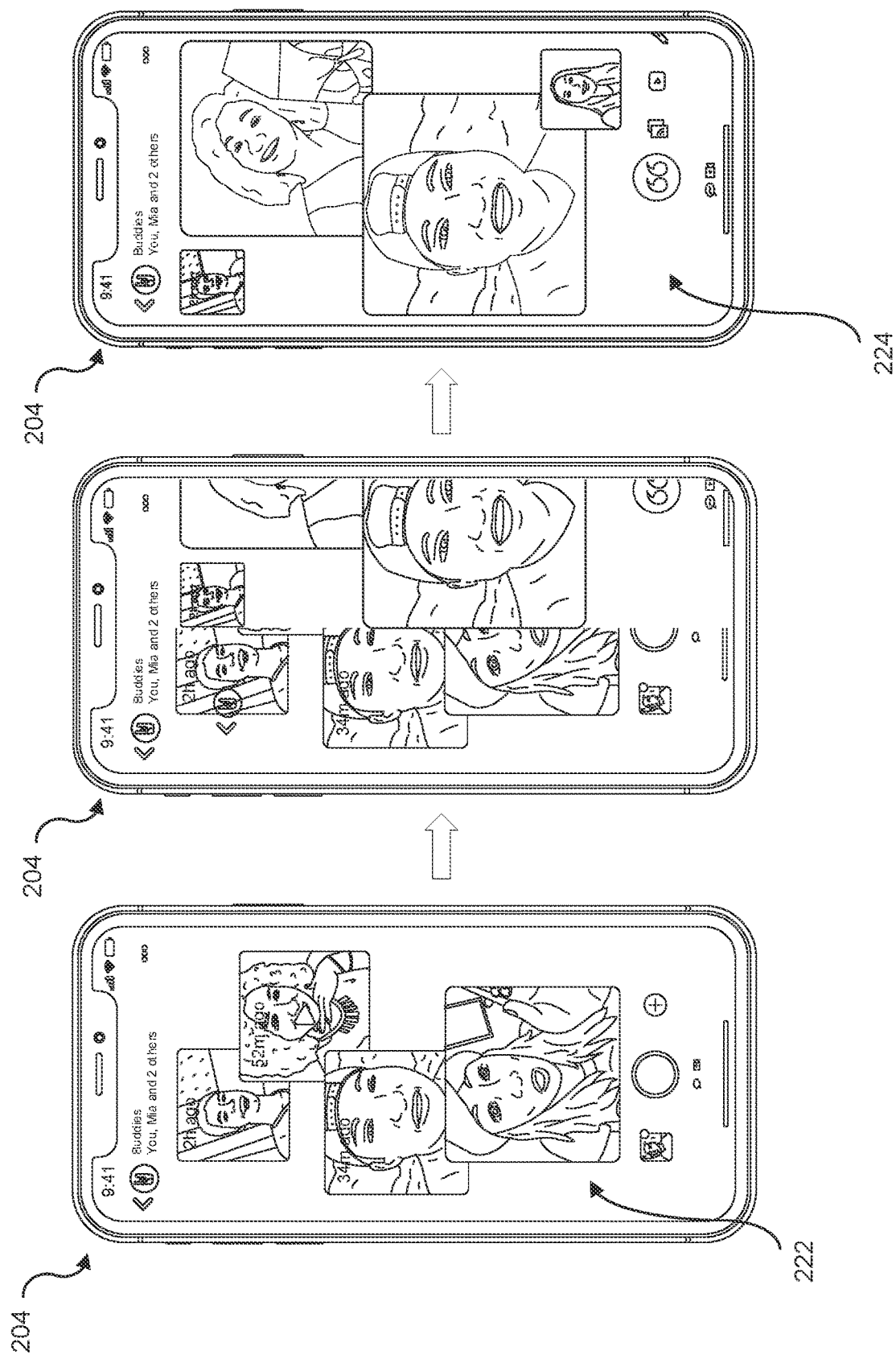
FIG. 15 is an illustration of an exemplary interface transitioning from displaying a lobby-state interface to displaying a corresponding live-state interface.

In some embodiments in which digital video room 214 corresponds to a digital thread, providing module 218 may provide access to digital video room 214 in response to receiving user input to the digital thread (e.g., to a selectable element included in a full-screen display of the thread). Using FIG. 3B as a specific example, providing module 218 may provide access to digital video room 214 in response to receiving user input selecting video room element 306. Similarly, providing module 218 may provide access to digital video room 214 in response to receiving user input selecting a selectable element associated with the digital thread within a thread summary interface. FIG. 13 illustrates an exemplary thread summary interface 1300 with a thread summary display that includes a selectable element 1302 that triggers access to digital video room 214 when selected via user input. In some embodiments, selectable video room elements within a thread summary interface may be provided persistently. In other embodiments, selectable video room elements, such as selectable elements 1302, 1304, and 1306, may only appear within a thread summary interface if a certain condition is met (e.g., there is an un-viewed user tile communication in a corresponding digital video room and/or a video conference is currently underway in a corresponding digital video room).

In some examples, providing module 218 may provide access to digital video room 214 in response to receiving user swiping input to an interface and/or display of a corresponding digital thread. In some such examples, providing module 218 may enable a user to toggle back and forth between an interface of the corresponding digital thread and an interface of digital video room 214 (e.g., lobby interface 222 and/or live interface 224) using swiping input. For example, providing module 218 may provide access to the interface of the corresponding digital thread in response to receiving swiping input that swipes in a first direction (e.g., left) and may provide access to an interface of digital video room 214 in response to receiving swiping input that swipes in a second direction (e.g., right). Using FIG. 14 as a specific example, providing module 218 may transition from providing group chat interface 300 to providing lobby interface 222 (e.g., by horizontally group chat interface 300 out of view in a designated direction and horizontally sliding lobby interface 222 into view via the same designated direction) in response to receiving user scrolling input in the designated direction. Conversely, providing module 218 may transition from providing lobby interface 222 to providing group chat interface 300 in response to receiving user scrolling input in the opposite direction.

In response to determining that video room access has been triggered, providing module 218 may determine whether to provide lobby interface 222 or live interface 224 in a variety of ways (e.g., based on a variety of criteria). In some examples, lobby interface 222 may always be presented by default. Alternatively, live interface 224 may always be presented by default. In other examples, which interface is presented may be dictated by a condition. For example, lobby interface 222 may be presented if no other users are currently accessing digital video room 214 but live interface 224 may be presented if other users are currently accessing digital video room 214 and/or if other users are currently engaging in a live video conference via digital video room 214.

Once access has been provided to digital video room 214, providing module 218 may toggle between providing lobby interface 222 and live interface 224 in response to a variety of different triggering events. In some embodiments, providing module 218 may toggle between the two interfaces in response to receiving user swiping input to an interface currently being displayed. Using FIG. 15 as a specific example, providing module 218 may transition from providing lobby interface 222 (e.g., by horizontally sliding lobby interface 222 out of view in a designated direction) to providing live interface 224 (e.g., by horizontally sliding live interface 224 into view via the same designated direction) in response to receiving user swiping input (e.g., input that scrolls in the designated direction).

The disclosed video conferencing system may provide a variety of alerts to improve user engagement. In some examples, an alert may enable serendipitous video conferencing. For example, a user visiting lobby interface 222 may be alerted if another user from users 216 is also visiting an instance of the lobby interface. As a specific example, an alert may include text such as "Jenny is also here," which may additionally include a prompt such as "Start a video conference?" or "Swipe right to video conference!"

In some embodiments, an alert may enable the various interfaces involved in the system (e.g., lobby interface 222, live interface 224, and/or a digital thread interface) to be used cohesively. For example, in examples in which digital video room 214 corresponds to a digital thread, an interface of the digital thread may display alerts relating to activity within digital video room 214. Conversely, an interface of digital video room 214 may display alerts relating to activity within the digital thread. Using FIG. 3A as a specific example, an alert 304 within group chat interface 300 may indicate that users have started video conferencing via live interface 224. Using FIG. 16 as another specific example, an alert 1600 within live interface 224 may display content and/or a summary of content 1602 transmitted via group chat interface 300. Selectable elements 1302, 1304, and 1306 in FIG. 13 provide another specific example of alerts presented within a digital thread summary interface that may indicate activity occurring within digital video room 214.

In some examples, the digital video room system disclosed herein may include a nearby chats feature that enables location-based digital video rooms. The location-based digital video rooms may be persistently tied to a location and may have an ephemeral membership, only enabling access to users with a device that is currently located within a defined geographic area. In these examples, providing module 218 may (1) determine that a group of users are currently in a defined geographic area corresponding to a location-based digital video room and (2) provide the group of users with access to the location-based digital video room in response to the determination. Additionally, providing module 218 may (1) determine that one or more of the users within the group has left the defined geographic area and (2) block access to the location-based digital video room for those users. In some examples, a location-based video room may include all of the features described herein in connection with steps 110 and 120 (e.g., a lobby state, a live state, a video room activity archive, etc.). Alternatively, a location-based video room may only enable a subset of such features (e.g., providing a lobby state but no live state) and/or modified features (e.g., a live state that enables only audio streaming and/or only text exchange).

Figure 17:
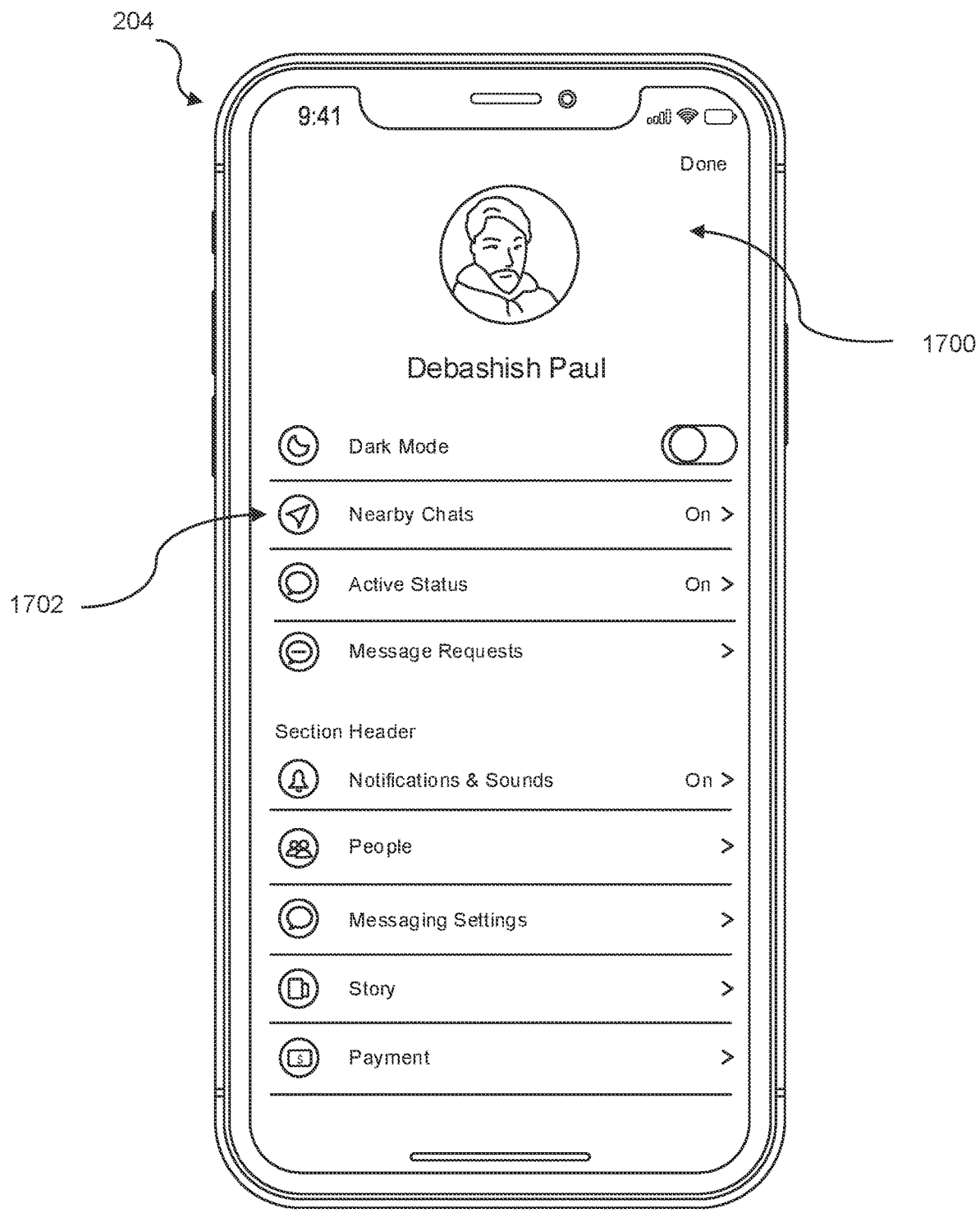
FIG. 17 is an illustration of an exemplary settings interface that enables a nearby chats setting to be selected.

In location-centric embodiments, a platform (e.g., a video conferencing platform and/or social media platform 206) may enable a user creating a digital video room to configure the digital video room with a geographically determined membership, limiting access to the digital video room to users that are currently within a user-defined geographic area. The geographic area may be user-defined in a variety of ways (e.g., a set of coordinates, a descriptor such as a particular airport and/or coffee shop, etc.). In some examples, users with potential to access location-based digital video rooms may select a setting to enable or disable such access. FIG. 17 provides an exemplary illustration of a settings interface 1700 in which a user may enable the user's access to location-based digital video rooms via a nearby chats icon 1702.

Figure 18:
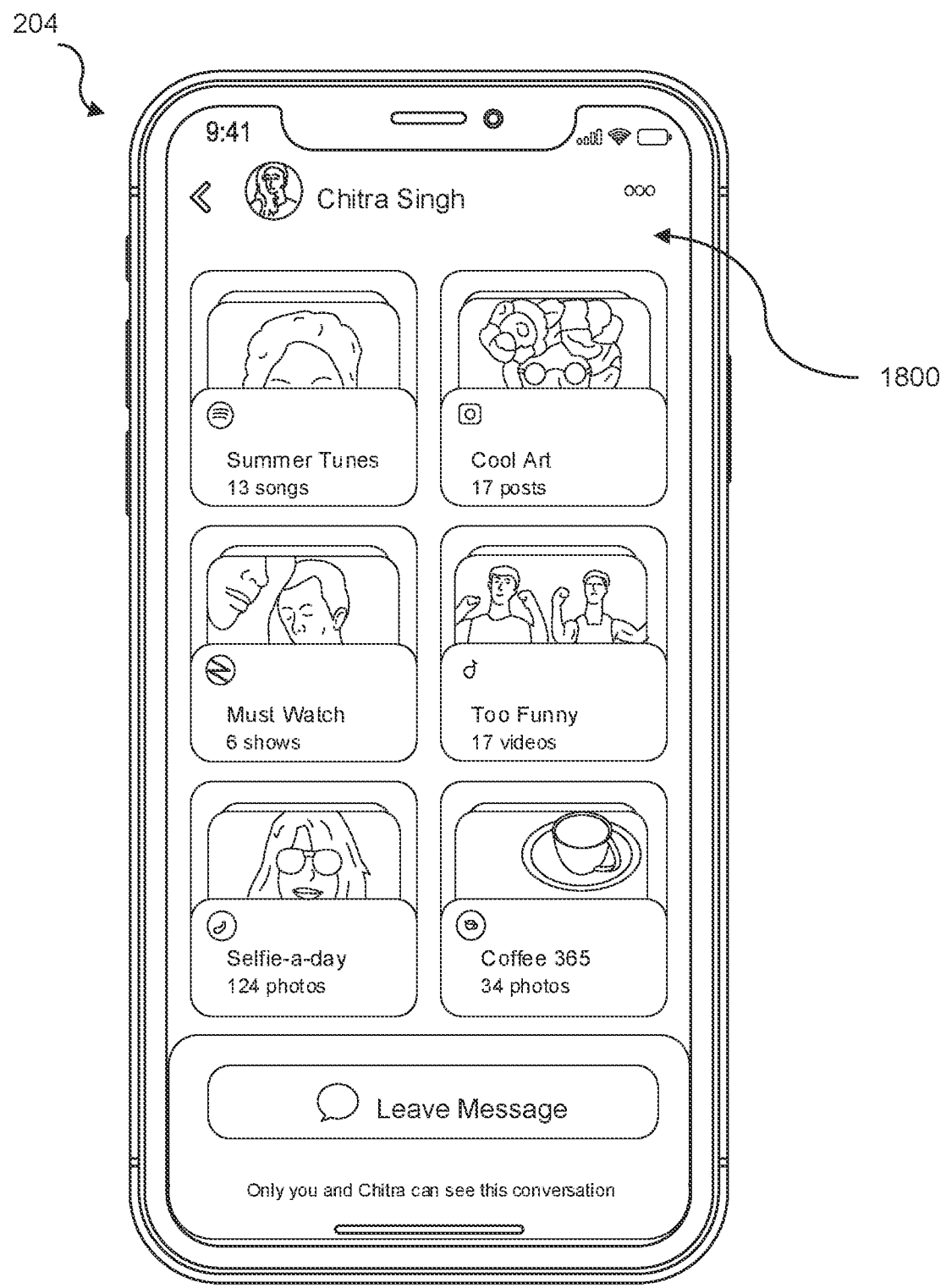
FIG. 18 is an illustration of an exemplary content-storage interface that may correspond to a digital video room.

In some embodiments, the digital video room system disclosed herein may provide a storage structure that enables users to easily share stored content (e.g., in a video conferencing context). In one such example, the storage structure may correspond to a given digital video room. In some examples, providing module 218 may enable access to the storage structure via a link that is persistently provided in an interface of a digital video room (e.g., an interface of a live interface of the digital video room). Additionally or alternatively, providing module 218 may enable a user to (1) curate content within the storage structure (e.g., by uploading content and/or selecting and/or submitting a link to content) and (2) invite other users to (i) view such content and/or (ii) digitally engage with the user via the storage structure (e.g., via comments). In some such examples, creation module 212 may create a digital video room to correspond to the storage structure (e.g., with the user and those invited to view as members). FIG. 18 provides an exemplary illustration of a content interface 1800 that may be used to share content between users.

As described above, the disclosed systems and methods provide a digital video conferencing system with a variety of advantages. In some examples, the disclosed digital video conferencing system may enable a fidelity of togetherness between digital message threads and digital video rooms. Additionally, unlike traditional real-time video calls that provide no ability to communicate for users when they are not available at the same time and that provide a space that dies when a call ends, the disclosed digital video conferencing system enables both asynchronous and persistent communication. In some examples, existing messaging threads may be extended by creating a corresponding digital video room (e.g., shared streaming space) for each thread, creating a sense of continual connection between users. The digital video rooms may enable a lobby state for asynchronous communication and a live state for real-time communication.

EXAMPLE EMBODIMENTS

Example 1: A computer-implemented method may include (1) creating a digital video room for a group of users that is configured to alternate between a lobby state and a live state and, in response to a triggering event, (2) toggling between (i) a lobby interface, corresponding to the lobby state, that enables asynchronous digital exchanges between the users of the group and (ii) a live interface, corresponding to the live state, that enables synchronous video conferencing between the users of the group.

Example 2: The computer-implemented method of example 1, where creating the digital video room includes (1) identifying a digital thread with the group of users as participants and (2) automatically creating the digital video room to correspond to the digital thread in response to identifying the digital thread.

Example 3: The computer-implemented method of examples 1-2, where the computer-implemented method further includes maintaining the digital video room as long as the digital thread is active.

Example 4: The computer-implemented method of examples 1-3, where the computer-implemented method further includes enabling the users of the group to toggle between an interface of the digital thread and an interface of the digital video room by swiping in a first direction to access the interface of the digital thread and swiping in a second direction to access the interface of the digital video room.

Example 5: The computer-implemented method of examples 1-4, where the lobby interface includes a home screen that displays a user tile for each user in the group of users.

Example 6: The computer-implemented method of examples 1-5, where each user tile includes a thumbnail of a digital artifact left by a user, a user's activity status, a snapshot of a camera frame from a user's most recent live video appearance to the digital video room, a music player associated with a user, a graphic, a profile image, and/or a user-generated poll.

Example 7: The computer-implemented method of examples 1-6, where the digital artifact includes a video message, an audio message, and/or an avatar message.

Example 8: The computer-implemented method of examples 1-7, where each user tile includes a timestamp of the last time a corresponding user visited the digital video room.

Example 9: The computer-implemented method of examples 1-8, where the lobby interface further includes a tile-archive screen with a timeline of user tiles previously displayed via the home screen.

Example 10: The computer-implemented method of examples 1-9, where the timeline of user tiles includes (1) a clustered display of all previous user tiles organized by date and/or (2) a serial display that presents previous user tiles one by one.

Example 11: The computer-implemented method of examples 1-10, where the computer-implemented method further includes transmitting, via the live interface, for one or more users of the group, a live user video stream that includes a video of the user and/or an animation corresponding to the user.

Example 12: The computer-implemented method of examples 1-11, where the animation corresponding to the user is configured to move in sync with live audio of the user.

Example 13: The computer-implemented method of examples 1-12, where the live interface further includes group content streamed in addition to the one or more live user video streams.

Example 14: The computer-implemented method of examples 1-13, where the group content includes a webpage and/or a digital film.

Example 15: The computer-implemented method of examples 1-14, where the computer-implemented method further includes (1) receiving, from a user of the group, video from both (i) a front-facing camera of the user's device and (ii) a back-facing camera of the user's device and (2) simultaneously transmitting, via the live interface, both (i) a first live video stream comprising video from the front-facing camera of the user's device and (ii) a second live video stream comprising video from the back-facing camera of the user's device.

Example 16: The computer-implemented method of examples 1-15, where (1) the digital video room is configured with an ephemeral membership tied to a defined geographic area and (2) creating the digital video room includes (i) determining that the group of users are currently in the defined geographic area and (ii) providing the group of users with access to the digital video room in response to the determination.

Example 17: The computer-implemented method of examples 1-16, where the computer-implemented method further includes determining that one or more of the users within the group have left the defined geographic area and, in response, blocking access to the digital video room for the users that have left the defined geographic area.

Example 18: The computer-implemented method of examples 1-17, where the computer-implemented method further includes (1) providing a user of the group with a storage structure corresponding to the digital video room, (2) receiving one or more data items from the user to be stored in the storage structure and storing the data items in the storage structure, and (3) enabling the user to share the one or more data items from the storage structure during a live video conference streaming via the live interface.

Example 19: A system for implementing the above-described method may include at least one physical processor and physical memory that includes computer-executable instructions that, when executed by the physical processor, cause the physical processor to (1) create a digital video room for a group of users that is configured to alternate between a lobby state and a live state and, in response to a triggering event, (2) toggle between (i) a lobby interface, corresponding to the lobby state, that enables asynchronous digital exchanges between the users of the group and (ii) a live interface, corresponding to the live state, that enables synchronous video conferencing between the users of the group.

Example 20: A non-transitory computer-readable medium may include one or more computer-readable instructions that, when executed by at least one processor of a computing device, cause the computing device to (1) create a digital video room for a group of users that is configured to alternate between a lobby state and a live state and, in response to a triggering event, (2) toggle between (i) a lobby interface, corresponding to the lobby state, that enables asynchronous digital exchanges between the users of the group and (ii) a live interface, corresponding to the live state, that enables synchronous video conferencing between the users of the group.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device (e.g., memory device 226 and/or 228 in FIG. 2) and at least one physical processor (e.g., physical processor 230 and physical processor 232 in FIG. 2).

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    creating, for a group of users participating in a group chat via a group chat interface, a digital video room comprising (1) a lobby interface that enables asynchronous digital exchanges and (2) a live interface that enables synchronous video conferencing, wherein:
        the lobby interface comprises a set of lobby user tiles, consisting of only one lobby user tile for each user in the group of users, and the live interface comprises a set of live user tiles, consisting of only one live user tile for each user in the group of users; and
        each lobby user tile displays a thumbnail of a digital user artifact and each live user tile displays a live user media stream; and
    toggling between presenting the group chat interface, the lobby interface, and the live interface by horizontally sliding between the group chat interface, the lobby interface and the live interface in response to user swiping input.

2. The computer-implemented method of claim 1, wherein creating the digital video room comprises:
    identifying a digital thread with the group of users as participants; and
    automatically creating the digital video room to correspond to the digital thread in response to identifying the digital thread.

3. The computer-implemented method of claim 2, further comprising maintaining the digital video room as long as the digital thread is active.

4. The computer-implemented method of claim 1, wherein each lobby user tile and each live user tile are configured as a same shape.

5. The computer-implemented method of claim 1, wherein the lobby interface represents a home screen.

6. The computer-implemented method of claim 1, wherein each lobby user tile comprises at least one of:
    a user's activity status;
    a snapshot of a camera frame from a user's most recent live video appearance to the digital video room;
    a music player associated with a user;
    a graphic;
    a profile image; or
    a user-generated poll.

7. The computer-implemented method of claim 1, wherein the digital user artifact comprises at least one of:
    a video message;
    an audio message; or
    an avatar message.

8. The computer-implemented method of claim 1, wherein each lobby user tile comprises a timestamp of the last time a corresponding user visited the digital video room.

9. The computer-implemented method of claim 1, wherein the lobby interface navigates to a tile-archive screen comprising a timeline of lobby user tiles previously displayed via the lobby interface.

10. The computer-implemented method of claim 9, wherein the timeline of lobby user tiles comprises at least one of:
    a clustered display of all previous lobby user tiles organized by date; or
    a serial display that presents previous lobby user tiles one by one.

11. The computer-implemented method of claim 1, wherein the live user media stream comprises at least one of:
a video of a user; or
an animation corresponding to a user, wherein the animation corresponding to the user is configured to move in sync with live audio of the user.

12. The computer-implemented method of claim 11, wherein the live interface further comprises group content, comprising at least one of a webpage or a digital film.

13. The computer-implemented method of claim 1, further comprising:
receiving, from a user of the group of users, video from both (1) a front-facing camera of a device of the user and (2) a back-facing camera of the user's device; and
simultaneously transmitting, via the live interface, both (1) a first live video stream comprising video from the front-facing camera of the user's device and (2) a second live video stream comprising video from the back-facing camera of the user's device.

14. The computer-implemented method of claim 1, further comprising:
creating an additional digital video room with an ephemeral membership tied to a defined geographic area, wherein creating the additional digital video room comprises:
determining that an additional group of users are currently in the defined geographic area; and
providing the additional group of users with access to the additional digital video room in response to the determination; and
the computer-implemented method further comprises determining that one or more of the users within the additional group of users have left the defined geographic area and, in response, blocking access to the additional digital video room for the users within the additional group of users that have left the defined geographic area.

15. The computer-implemented method of claim 1, wherein the lobby interface comprises a full-screen interface and the live interface comprises a full-screen interface.

16. The computer-implemented method of claim 1, further comprising:
providing a user of the group of users with a storage structure corresponding to the digital video room;
receiving one or more data items from the user to be stored in the storage structure and storing the data items in the storage structure; and
enabling the user to share the one or more data items from the storage structure during a live video conference streaming via the live interface.

17. A system comprising:
at least one physical processor;
physical memory comprising computer-executable instructions that, when executed by the physical processor, cause the physical processor to:
create, for a group of users participating in a group chat via a group chat interface, a digital video room comprising (1) a lobby interface that enables asynchronous digital exchanges and (2) a live interface that enables synchronous video conferencing, wherein:
the lobby interface comprises a set of lobby user tiles, consisting of only one lobby user tile for each user in the group of users, and the live interface comprises a set of live user tiles, consisting of only one live user tile for each user in the group of users; and
each lobby user tile displays a thumbnail of a digital user artifact and each live user tile displays a live user media stream; and
toggle between presenting the group chat interface, the lobby interface, and the live interface by horizontally sliding between the group chat interface, the lobby interface and the live interface in response to user swiping input.

18. A non-transitory computer-readable medium comprising one or more computer-readable instructions that, when executed by at least one processor of a computing device, cause the computing device to:
create, for a group of users participating in a group chat via a group chat interface, a digital video room comprising (1) a lobby interface that enables asynchronous digital exchanges and (2) a live interface that enables synchronous video conferencing, wherein:
the lobby interface comprises a set of lobby user tiles, consisting of only one lobby user tile for each user in the group of users, and the live interface comprises a set of live user tiles, consisting of only one live user tile for each user in the group of users; and
each lobby user tile displays to a thumbnail of a digital user artifact and each live user tile displays a live user media stream; and
toggle between presenting the group chat interface, the lobby interface, and the live interface by horizontally sliding between the group chat interface, the lobby interface and the live interface in response to user swiping input.

19. The computer-implemented method of claim 1, further comprising creating an additional digital video room for a group of users participating in a thread of comments responding to a social media post.

20. The computer-implemented method of claim 1, wherein the live user tiles represent dynamic tiles configured to change positions within the live interface based on an activity metric.

* * * * *